(12) United States Patent
Nakatsugawa

(10) Patent No.: US 8,937,905 B2
(45) Date of Patent: Jan. 20, 2015

(54) BASE STATION APPARATUS, WIRELESS TERMINAL, COMMUNICATION SYSTEM AND METHOD FOR CONTROLLING COMMUNICATION SYSTEM

(75) Inventor: Keiichi Nakatsugawa, Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 141 days.

(21) Appl. No.: 13/461,232

(22) Filed: May 1, 2012

(65) Prior Publication Data

US 2012/0218941 A1  Aug. 30, 2012

Related U.S. Application Data

(63) Continuation of application No. PCT/JP2009/068889, filed on Nov. 5, 2009.

(51) Int. Cl.
- *H04W 4/00* (2009.01)
- *H04W 52/02* (2009.01)
- *H04W 76/04* (2009.01)
- *H04W 88/08* (2009.01)

(52) U.S. Cl.
CPC ........ *H04W 52/0206* (2013.01); *H04W 76/048* (2013.01); *H04W 88/08* (2013.01)
USPC ...................................................... 370/328

(58) Field of Classification Search
USPC ...................................................... 370/328
See application file for complete search history.

(56) References Cited

U.S. PATENT DOCUMENTS

| | | | |
|---|---|---|---|
| 2006/0009242 A1* | 1/2006 | Ryu et al. ........................ | 455/458 |
| 2008/0095092 A1* | 4/2008 | Kim .............................. | 370/311 |
| 2010/0240420 A1* | 9/2010 | Chin et al. ...................... | 455/574 |
| 2010/0323610 A1* | 12/2010 | Li et al. ........................ | 455/3.01 |
| 2012/0021735 A1* | 1/2012 | Maeder et al. ............... | 455/422.1 |

FOREIGN PATENT DOCUMENTS

| | | |
|---|---|---|
| JP | 2007-251564 | 9/2007 |
| JP | 2009-111624 | 5/2009 |
| JP | 2009-182619 | 8/2009 |
| JP | 2010-010919 | 1/2010 |

OTHER PUBLICATIONS

IEEE P802.16m/D2; "Pad 16: Air Interface for Fixed and Mobile Broadband Wireless Access Systems"; Advanced Air Interface; Oct. 2009.
International search report with English translation issued for corresponding Japanese Patent Application No. PCT/JP2009/068889 mailed Feb. 16, 2010.

* cited by examiner

*Primary Examiner* — Huy D Vu
*Assistant Examiner* — Kevin Cunningham
(74) *Attorney, Agent, or Firm* — Myers Wolin, LLC

(57) ABSTRACT

A base station apparatus that wirelessly communicates with a wireless terminal, including: a determination portion that determines a mode of the wireless terminal that exists in a service area of the base station apparatus; and a setting portion that sets a first mode in which a first period in which the base station apparatus is communicable with the wireless terminal and a second period in which the base station apparatus is incommunicable with the wireless terminal are provided alternately, based on a result of the determination of the determination portion, and sets a length of the second period based on the result of the determination of the determination portion.

11 Claims, 24 Drawing Sheets

FIG. 7

| WIRELESS TERMINAL | STATUS |
|---|---|
| MS1 | SLEEP MODE |

BASE STATION APPARATUS, WIRELESS TERMINAL, COMMUNICATION SYSTEM AND METHOD FOR CONTROLLING COMMUNICATION SYSTEM

CROSS-REFERENCE TO RELATED APPLICATION

This application is a continuation of and claims priority to International Patent Application No. PCT/JP2009/068889 filed Nov. 5, 2009, now pending, the contents of which are herein wholly incorporated by reference.

FIELD

A certain aspect of the embodiments is related to a base station apparatus, a wireless terminal, a communication system, and a method for controlling a communication system.

BACKGROUND

In recent years, a wireless communication system which covers a wide area such as a cellular network or a WiMAX (IEEE802.16) is developed. A system including, for example, a Femto Cell which is a wireless communication area narrower than a macro base station, and such a wireless communication area of the base station (macro base station) in the wireless communication system is developed. A Femto Cell system cancels an unfeeling area of radio waves caused when only the macro base station is installed, and expands the wireless communication area more. In the Femto Cell system, a small Femto base station is installed in a house, such as a member's house and a building.

To reduce the interference which an electromagnetic wave by communication between the Femto base station and the wireless terminal gives to surroundings, there is known a technique that an idle period in which the Femto base station does not transmit a wireless signal temporarily is set (See P802. 16m/D2 October 2009).

SUMMARY

According to an aspect of the present invention, there is provided a base station apparatus that wirelessly communicates with a wireless terminal, including: a determination portion that determines a mode of the wireless terminal that exists in a service area of the base station apparatus; and a setting portion that sets a first mode in which a first period in which the base station apparatus is communicable with the wireless terminal and a second period in which the base station apparatus is incommunicable with the wireless terminal are provided alternately, based on a result of the determination of the determination portion, and sets a length of the second period based on the result of the determination of the determination portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a management table;

DESCRIPTION OF EMBODIMENTS

A description will be given of embodiments of the invention, with reference to drawings.

Embodiment 1

Figure 1:
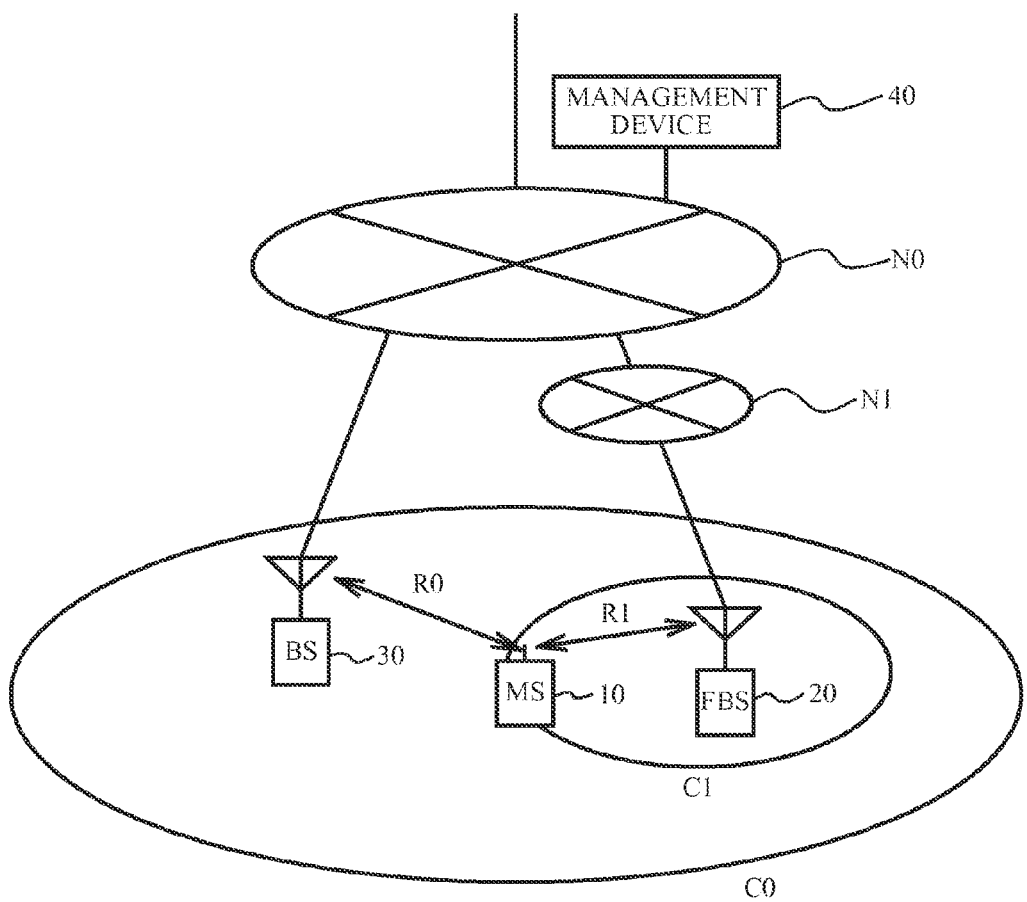
FIG. 1 is a block diagram of a system including a communication system according to a first embodiment.

FIG. 1 is a block diagram of a system including a communication system according to a first embodiment. As illustrated in FIG. 1, a base station apparatus 20 is located in a cell C0 of a base station apparatus 30. The base station apparatus 30 is a macro base station for example, and the base station apparatus 20 is a Femto base station for example. A wireless terminal 10 can execute communication R0 with the base station apparatus 30 in the cell C0. In addition, the wireless terminal 10 can execute communication R1 with the base station apparatus 20 in a cell C1 of the base station apparatus 20. The base station apparatus 20 is connected to a network N0 via a network N1. The base station apparatus 30 is connected to the network N0. A management device 40 is connected to the network N0. In addition, a wireless terminal is connected to the network N0 via another network, for example. Alternatively, an application server is connected to the network N0, for example. The network N1 is an internetwork for example, and the network N0 is a network for carriers of the communication system for example.

In the first embodiment, two modes of a first mode and a second mode can be set to the base station apparatus 20. The first mode is a mode in which the wireless terminal 10 sets an idle period temporarily, and is a low-duty operation mode, for example. In the first mode, a first period in which the base station apparatus 20 can communicate with the wireless terminal 10, and the idle period (hereinafter referred to as a "second period") in which the base station apparatus 20 cannot communicate with the wireless terminal 10 are provided alternately. The second mode is a mode in which the base station apparatus 20 can always communicate with the wireless terminal 10. That is, the wireless terminal 10 can always communicate with the base station apparatus 20.

Figure 2A:
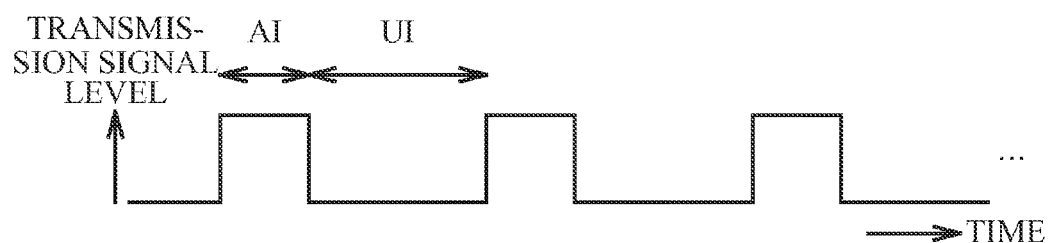
FIGS. 2A and 2B are time charts illustrating a level of a transmission signal which a base station apparatus 20 transmits to a wireless terminal 10 in a first mode.
Figure 2B:
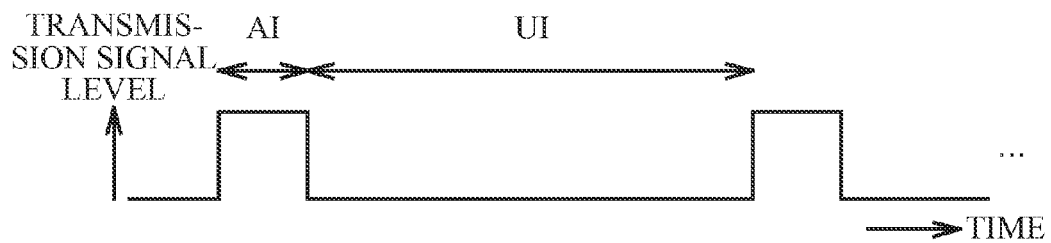

FIGS. 2A and 2B are time charts illustrating a level of a transmission signal which the base station apparatus 20 transmits to the wireless terminal 10 in the first mode. As illustrated in FIG. 2A, a first period AI and a second period UI are set alternately. The first period AI is a communicable period with a level of the transmission signal, for example. In the first period AI, the base station apparatus 20 can transmit a signal to the wireless terminal 10. The base station apparatus 20 can also a signal from the wireless terminal 10. The second period UI is an incommunicable period with no level of the transmission signal, for example. In the second period UI, the base station apparatus 20 cannot transmit a signal to the wireless terminal 10. Therefore, since the base station apparatus 20 also does not transmit control information to the wireless terminal 10, the wireless terminal 10 cannot communicate with the base station apparatus 20. In the first embodiment, the length of the second period UI is changeable. For example, the second period UI can be lengthened, as illustrated in FIG. 2B. The first period AI is a period in which a control signal can be communicated between the base station apparatus 20 and the wireless terminal 10, and is several hundred milliseconds to several seconds, for example. The second period UI is several seconds to several dozen seconds, for example.

A mode of the wireless terminal 10 includes, for example, a normal mode, a sleep mode, and an idle mode. The wireless terminal 10 of the normal mode establishes connection with the base station apparatus 20, and can always communicate with the base station apparatus 20. The wireless terminal 10 of the sleep mode establishes connection with the base station apparatus 20, and can intermittently communicate with the base station apparatus 20. That is, the sleep mode include a period in which the wireless terminal 10 can communicate with the base station apparatus 20, and a period in which the wireless terminal 10 cannot communicate with the base station apparatus 20. The wireless terminal 10 of the idle mode is not connected to the base station apparatus 20, and is in a standby state.

Figure 3A:
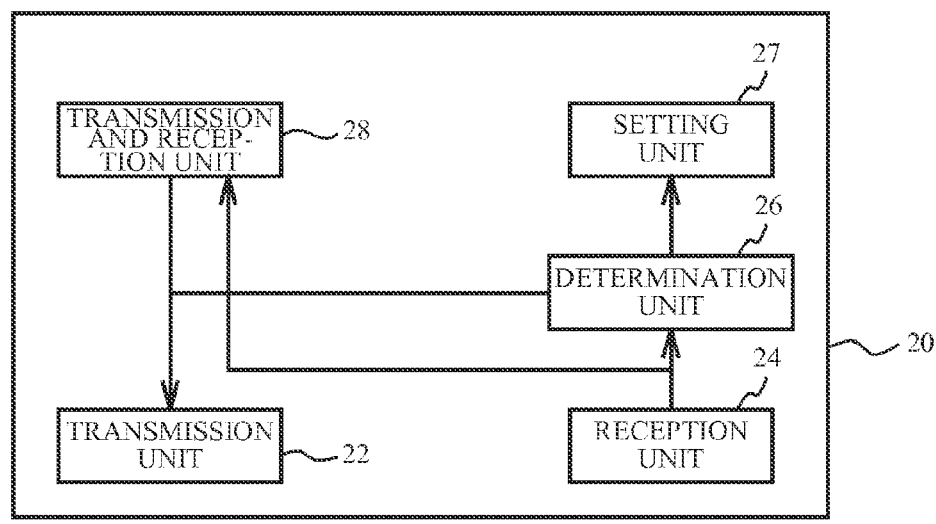
FIGS. 3A and 3B are block diagrams of the base station apparatus 20 and the wireless terminal 10, respectively.
Figure 3B:
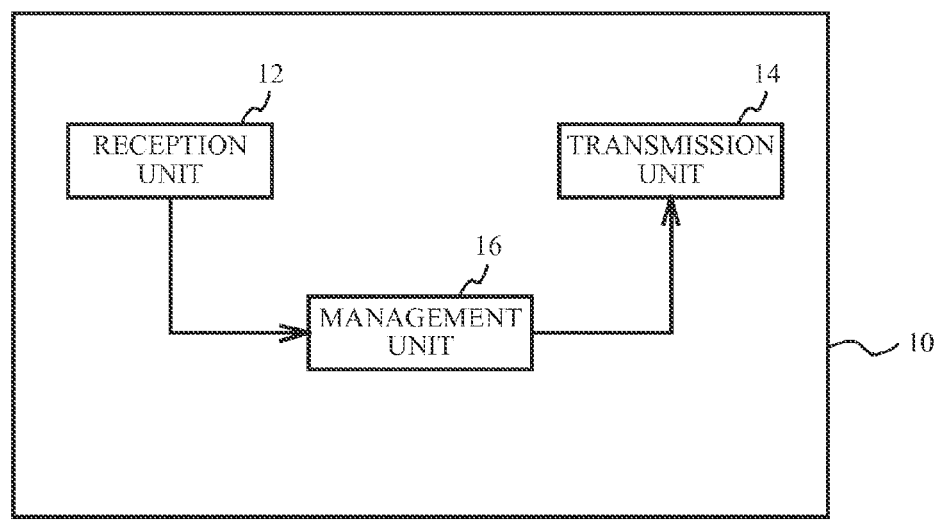

FIGS. 3A and 3B are block diagrams of the base station apparatus 20 and the wireless terminal 10, respectively. The base station apparatus 20 includes a transmission unit 22, a reception unit 24, a determination unit 26, a setting unit 27, and a transmission and reception unit 28. The transmission unit 22 transmits a signal to the wireless terminal 10. The reception unit 24 receives a signal from the wireless terminal 10. The determination unit 26 determines a mode of the wireless terminal 10 which exists in a service area (e.g. the cell C1) of the base station apparatus 20. The setting unit 27 sets the first mode or the second mode to the base station apparatus 20, based on a detection result of the determination unit 26. In the first mode, the length of the second period is set based on the detection result of the determination unit 26. The transmission and reception unit 28 transmits and receives a signal to/from the management device 40 via the network N1.

As illustrated in FIG. 3B, the wireless terminal 10 includes a reception unit 12, a transmission unit 14, and a management unit 16. The reception unit 12 receives a signal from the base station apparatus 20. The transmission unit 14 transmits a signal to the base station apparatus 20. The management unit 16 manages the reception unit 12, the transmission unit 14, and applications.

Figure 4:
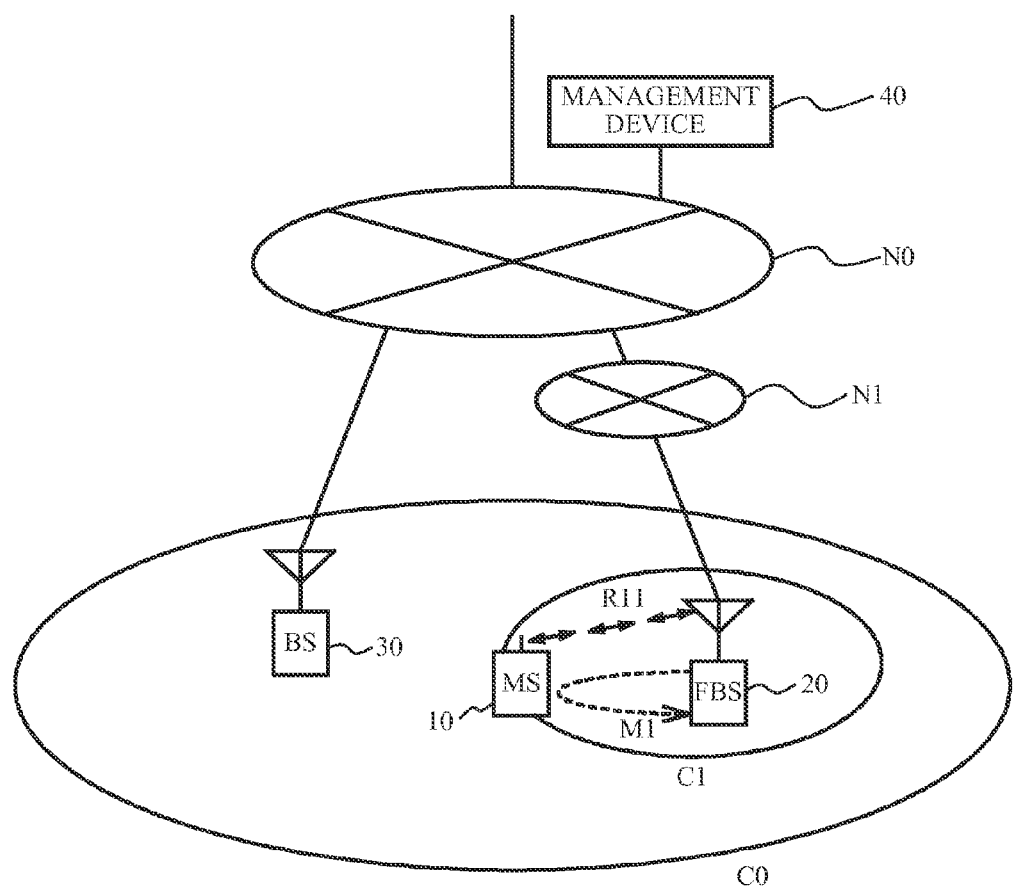
FIG. 4 is a block diagram of the communication system when the base station apparatus 20 is set to the first mode.

FIG. 4 is a block diagram of the communication system when the base station apparatus 20 is set to the first mode. Since the base station apparatus 20 is the first mode, the base station apparatus 20 and the wireless terminal 10 can communicate intermittently (R11). The determination unit 26 of the base station apparatus 20 monitors existence or nonexistence and the mode of the wireless terminal in the service area (e.g. the cell C1) (M1). The other construction of the communication system is the same as the construction of FIG. 1, and therefore description thereof is omitted.

Figure 5:
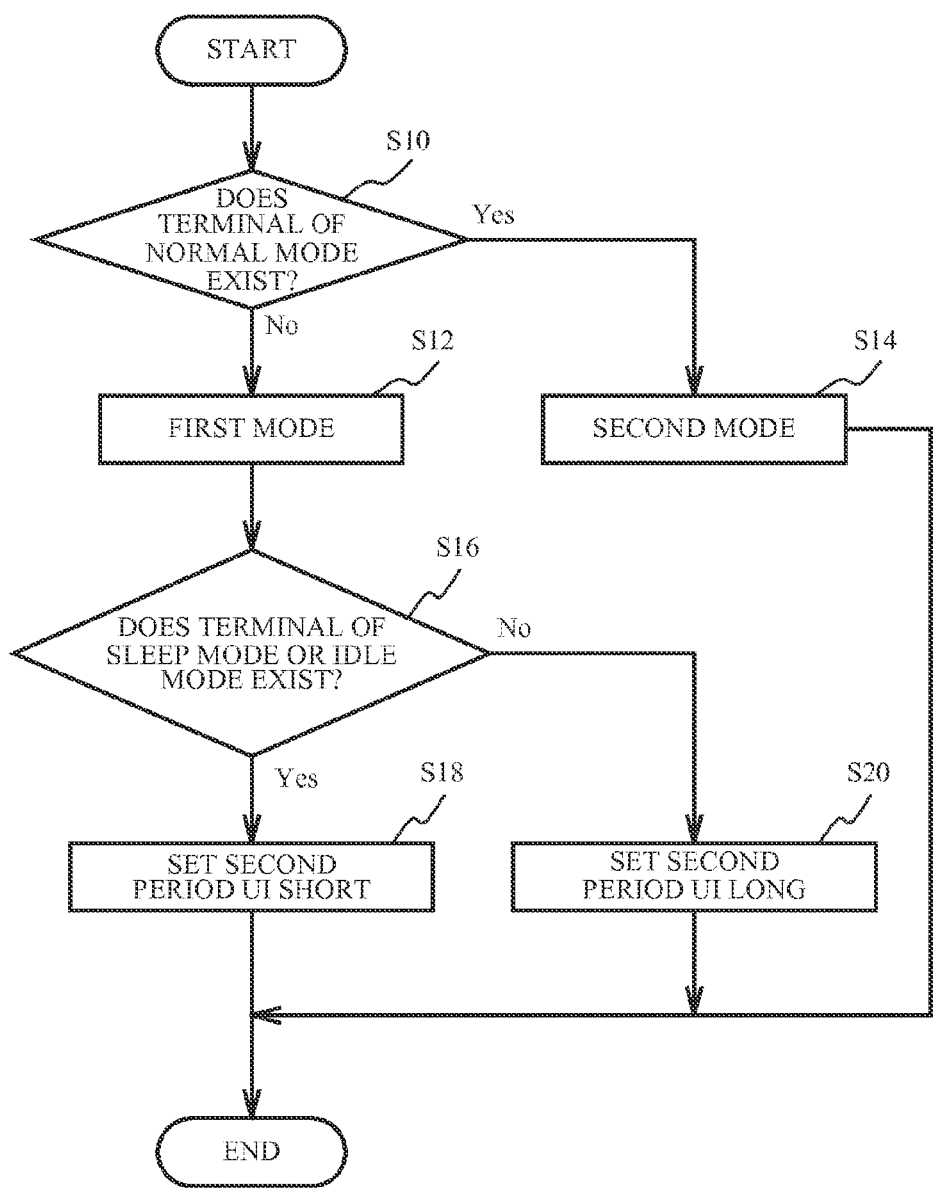
FIG. 5 is a flowchart illustrating a process of the base station apparatus 20.

FIG. 5 is a flowchart illustrating a process of the base station apparatus 20. The determination unit 26 determines whether the wireless terminal 10 of the normal mode exists in the service area (step S10). When the determination of step S10 is YES, the setting unit 27 sets the second mode in which the base station apparatus 20 can always communicate with the wireless terminal 10 (step S14). Then, the process is terminated. When the determination of step S10 is NO, the setting unit 27 sets the first mode in which the first period AI in which the base station apparatus 20 can communicate with the wireless terminal 10, and the second period UI in which the base station apparatus 20 cannot communicate with the wireless terminal 10 are provided alternately (step S12). In the first mode, the determination unit 26 determines whether the wireless terminal 10 of the sleep mode or the idle mode exists in the service area (step S16). When the determination of step S16 is YES, the setting unit 27 sets the second period UI short (step S18). When the determination of step S16 is NO, the setting unit 27 sets the second period UI long (step S20). Then, the process is terminated. The wireless terminal 10 of the normal mode exists in the service area, and the base station apparatus 20 is set to the second mode. In this state, when the determination unit 26 determines that the wireless terminal 10 of the normal mode in the service area changes to the sleep mode or the idle mode, and that the wireless terminal 10 of the normal mode does not exist in the service area, the setting unit 27 sets the first mode, and hence can set the second period short.

When the wireless terminal 10 of the sleep mode or the idle mode exists in the service area, the wireless terminal 10 may require the base station apparatus 20 to communicate with the base station apparatus 20. For example, when the wireless terminal 10 is the sleep mode, the wireless terminal 10 intermittently transmits and receives data and a control message to/from the base station apparatus 20 according to a predetermined pattern carrying out the negotiation with the base station apparatus 20. The intermittent transmission and reception are executed during the first period AI. However, when an application in which data to be transmitted from the wireless terminal 10 continuously occurs is started, the wireless terminal 10 requires the return to the normal mode from the sleep mode. That is, the wireless terminal 10 requires the base station apparatus 20 to be always able to communicate with the base station apparatus 20, and requires the base station apparatus 20 to set the second mode to the base station apparatus 20. However, when the second period UI is long, the return to the normal mode from the sleep mode delays. This is because, in the second period UI, the wireless terminal 10 cannot communicate with the base station apparatus 20.

For example, when the wireless terminal 10 is the idle mode, the wireless terminal 10 intermittently receives a signal from the base station apparatus 20. However, when the wireless terminal 10 moves over a position registration range in which cells are grouped, a position update request of the wireless terminal 10 is transmitted to the base station apparatus 20. When the wireless terminal 10 of the idle mode requires the return to the normal mode, if the second period UI is long, the return to the normal mode from the sleep mode delays.

In the first embodiment, the determination unit 26 determines a mode of the wireless terminal in the service area. The setting unit 27 sets the length of the second period UI, based on the determination result of the mode by the determination unit 26. Thereby, it is possible to properly set the length of the second period UI in the first mode.

As illustrated in steps S10 to S14 of FIG. 5, the setting unit 27 sets the second mode to the base station apparatus 20 when the wireless terminal 10 of the normal mode exists in the service area, and sets the first mode to the base station apparatus 20 when the wireless terminal 10 of the normal mode does not exist in the service area. Thereby, when the wireless terminal 10 of the normal mode does not exist in the service area, the second period can be provided and the interference to the surroundings by the electromagnetic wave can be restrained. When a use frequency of the base station apparatus 20 is the same as that of the base station apparatus 30, it is possible to restrain the electric wave of the base station apparatus 20 from interfering in communication between the base station apparatus 30 and the wireless terminal 10.

In addition, when the first mode is set as illustrated in steps S16 to S20 of FIG. 5, and the determination unit 26 determines that the wireless terminal 10 of the sleep mode exists in the service area, the setting unit 27 sets the second period UI short (e.g. set the second period UI to a first length). On the other hand, when the determination unit 26 determines that the wireless terminal 10 of the sleep mode dose not exist in the service area, the setting unit 27 sets the second period UI long (e.g. set the second period UI to a second length longer than the first length). The length of the second period UI when the second period UI is set short may be the first length, and the length of the second period UI when the second period UI is set long may be the second length.

When the first mode is set, and the determination unit 26 determines that the wireless terminal 10 of the idle mode exists in the service area, the setting unit 27 sets the second period UI short. When the determination unit 26 determines that the wireless terminal 10 of the idle mode does not exist in the service area, the setting unit 27 sets the second period UI long.

Thereby, the return to the normal mode from the sleep mode or the idle mode can be executed early. On the contrary, when the wireless terminal 10 of the sleep mode or the idle mode does not exist in the service area, the setting unit 27 sets the second period UI long, thereby decreasing the frequency of appearance of the first period AI. Thereby, the interference to the surroundings by the electromagnetic wave can be restrained.

The setting unit 27 may switch the length of the second period UI by two or many stages. Alternatively, the setting unit 27 may continuously change the length of the second period UI.

Embodiment 2

Figure 6:
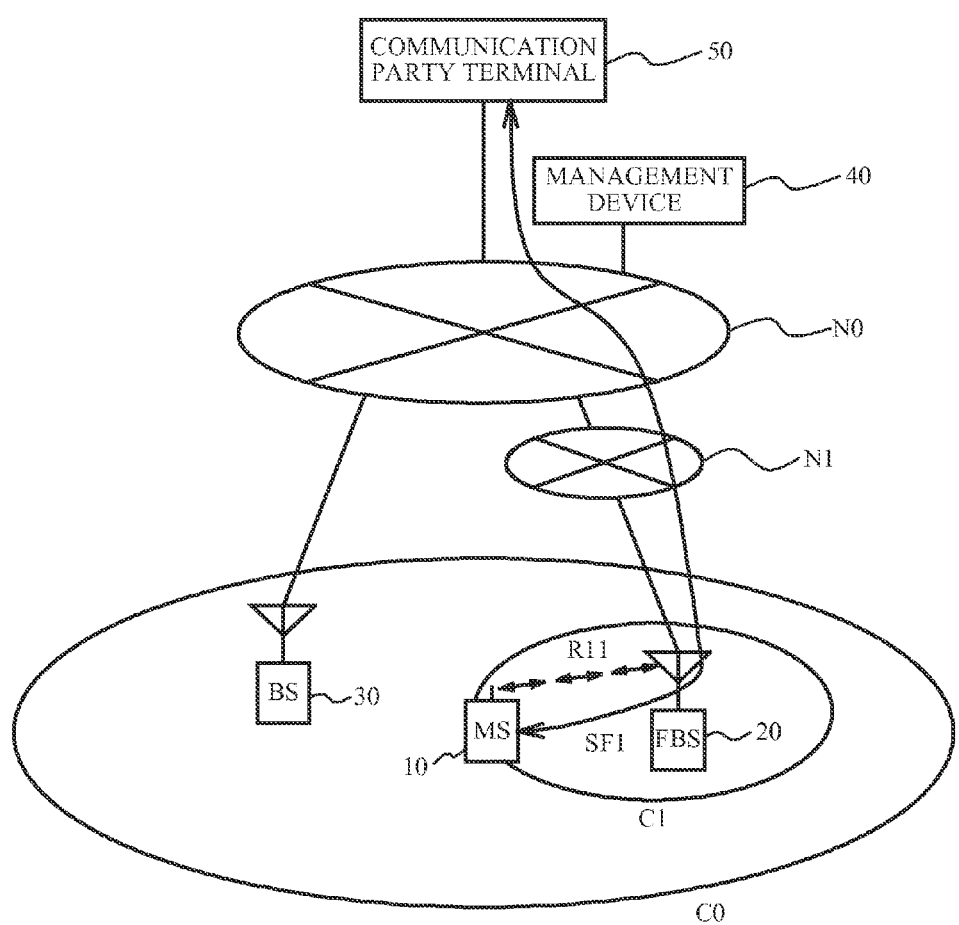
FIG. 6 is a schematic diagram of the communication system according to a second embodiment.

A second embodiment illustrates an example when the wireless terminal of the sleep mode exists in the service area of the base station apparatus. FIG. 6 is a schematic diagram of the communication system according to the second embodiment. The wireless terminal 10 is accessing the base station apparatus 20, and transmits and receives data on a service flow SF1 to/from a communication party terminal 50 connected to the network N0, via the base station apparatus 20. The base station apparatus 20 creates a management table about each of the accessing wireless terminals 10 based on a service flow SF1. The base station apparatus 20 manages the state of each of the accessing wireless terminals 10. The other construction of the communication system is the same as the construction of FIG. 4 of the first embodiment, and therefore description thereof is omitted.

Figure 7:
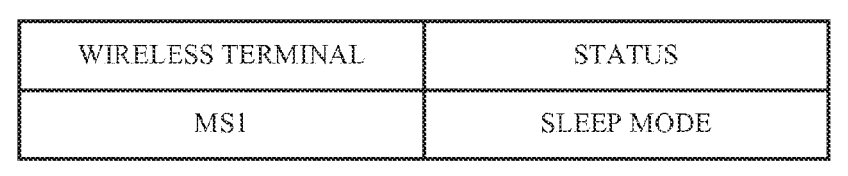

FIG. 7 is a diagram illustrating an example of the management table. The mode is stored for each wireless terminal. In FIG. 7, the wireless terminal MS1 is the sleep mode. According to the second embodiment, the determination unit 26 of the base station apparatus 20 creates a management table that associates each wireless terminal in the service area with the state of each wireless terminal, based on the content of the service flow SF1. Thereby, the determination unit 26 can easily detects the state of the wireless terminal 10.

Embodiment 3

A third embodiment illustrates an example when the wireless terminal of the idle mode exists in the service area of the base station apparatus. For example, in the wireless terminal 10 specified in IEEE802.16, the wireless terminal 10 becomes the idle mode as a standby state when the wireless terminal 10 does not execute the communication. The wireless terminal 10 of the idle mode registers to the management device 40 whether the wireless terminal 10 is located in an area of a paging group which is a plurality of grouped base stations. The management device 40 is a paging controller, for example. The management device 40 comprehends a location of the wireless terminal 10 of the idle mode for each paging group. Therefore, the management device 40 can comprehend that the wireless terminal 10 of the idle mode is located in a certain paging group, but cannot comprehend whether the wireless terminal 10 of the idle mode exists in the service area of the base station apparatus 20 or the base station apparatus 30.

Figure 8:
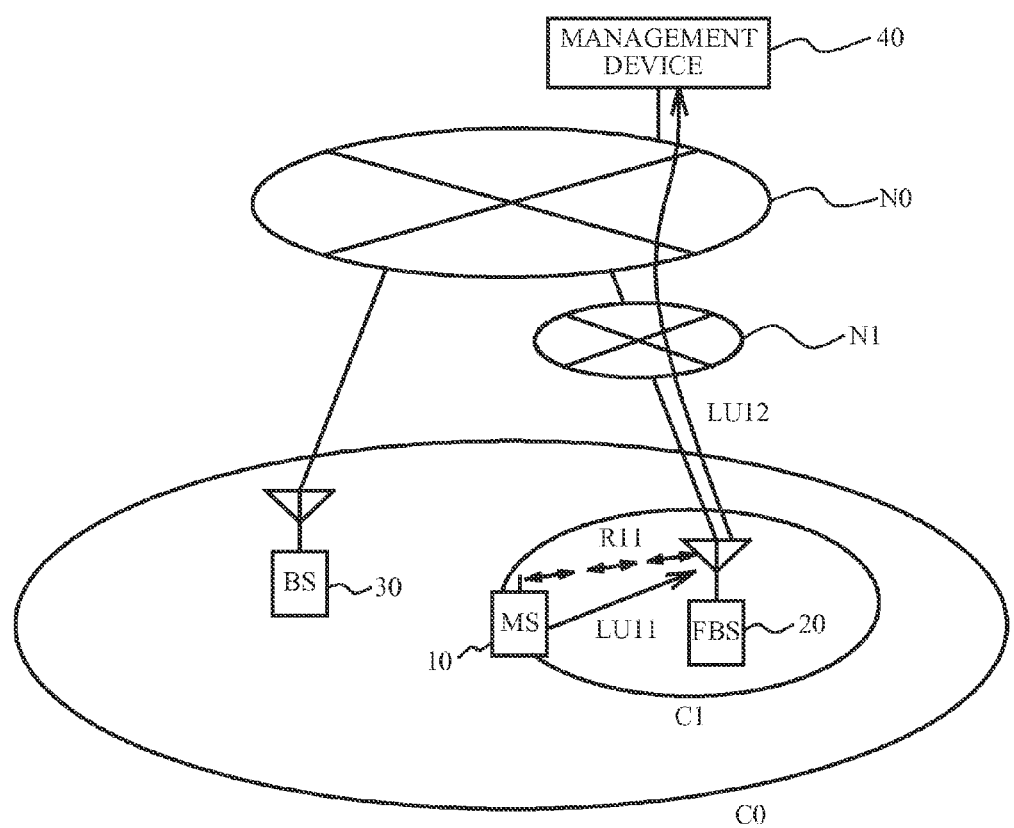
FIG. 8 is a schematic diagram of the communication system according to a third embodiment.

When the wireless terminal 10 of the idle mode moves between the paging groups, the wireless terminal 10 of the idle mode updates the location of the wireless terminal 10 to the management device 40. In addition, when the wireless terminal 10 of the idle mode also stays in the same paging group, the wireless terminal 10 of the idle mode periodically updates the location of the wireless terminal 10. FIG. 8 is a schematic diagram of the communication system according to the third embodiment. For example, the wireless terminal 10 of the idle mode transmits a location update request LU11 for updating a belonging area to the base station apparatus 20. The base station apparatus 20 transmits a location update request LU12 to the management device 40 via the network N1. The other construction of the communication system is the same as the construction of FIG. 4 of the first embodiment, and therefore description thereof is omitted. Thereby, the management device 40 can periodically comprehend the location of the wireless terminal 10 of the idle mode in the paging group.

Figure 9:
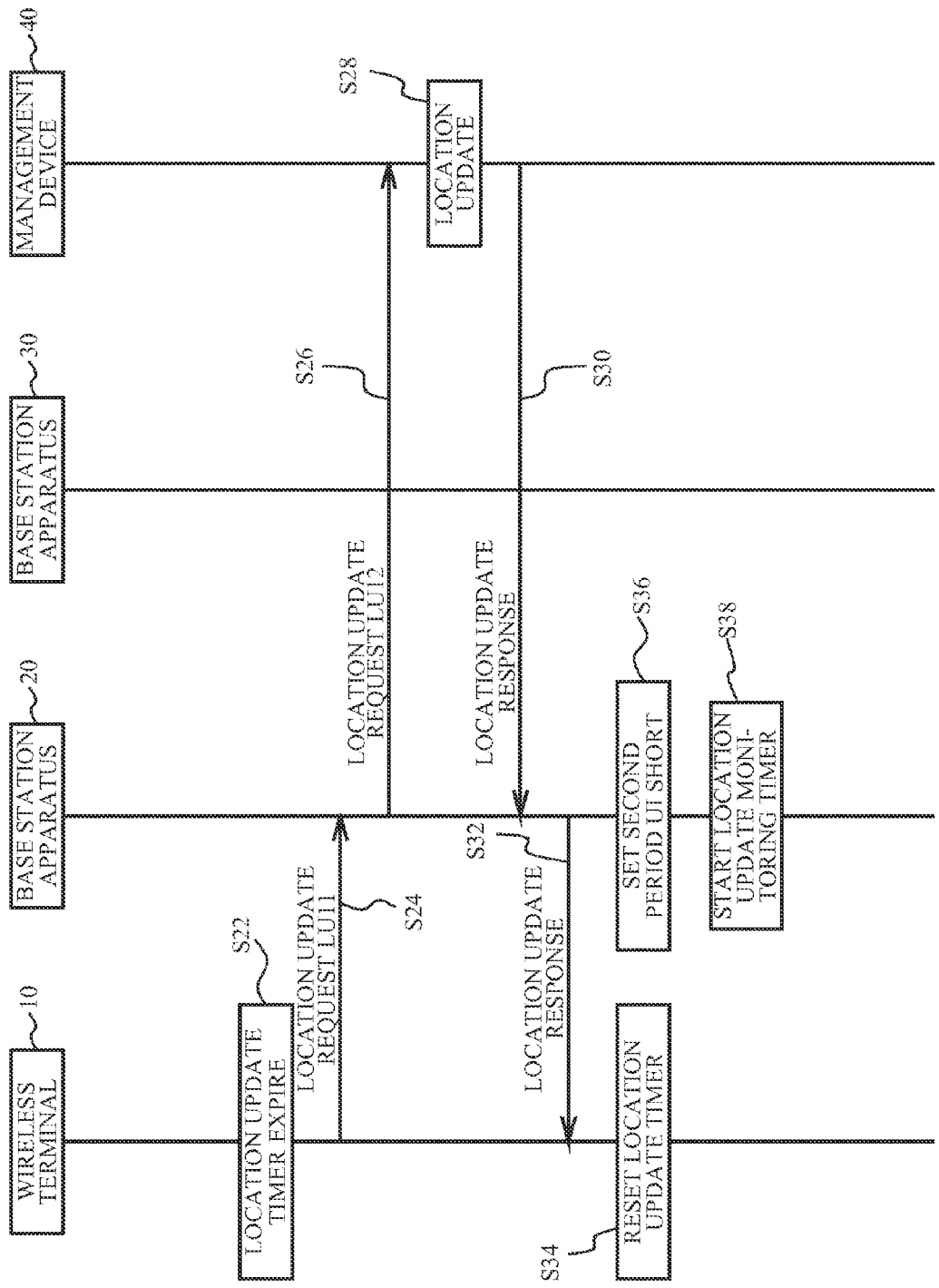
FIG. 9 is a sequence diagram of the communication system according to the third embodiment.

FIG. 9 is a sequence diagram of the communication system according to the third embodiment. In the wireless terminal 10, a timer used for periodically updating the location of the wireless terminal 10 expires (step S22). The wireless terminal 10 transmits the location update request LU11 including an identifier of the wireless terminal 10 to the base station apparatus 20 (step S24). The base station apparatus 20 transmits the location update request LU12 including the identifier of the wireless terminal 10 and an identifier of the base station apparatus 20 to the management device 40 (step S26). The management device 40 updates the paging group in which the wireless terminal 10 is located with the paging group to which the base station apparatus 20 belongs, based on the identifiers of the wireless terminal 10 and the base station apparatus 20 (step S28). In addition, the management device 40 may reset the timer used for updating the location (hereinafter referred to as "location update timer"). The management device 40 can also recognize that the wireless terminal 10 does not exist when the location of the wireless terminal 10 is not updated until the location update timer expires.

The management device 40 reports the completion of the location update to the base station apparatus 20 (step S30). When the first mode is set, the setting unit 27 of the base station apparatus 20 sets the second period UI short (step S36). The base station apparatus 20 activates a location update monitoring timer (step S38). The base station apparatus 20 reports the completion of the location update to the wireless terminal 10 (step S32). The wireless terminal 10 resets the location update timer (step S34). Steps S36 and S38 are may be executed after step S24.

According to the third embodiment, when the determination unit 26 detects the location update request from the wireless terminal 10, the determination unit 26 can determine that the wireless terminal 10 of the idle mode exists in the service area. Thereby, the determination unit 26 can easily determine the existence of the wireless terminal 10 of the idle mode in the service area. Moreover, the wireless terminal 10 can periodically request the location update by using the location update timer.

Although in the third embodiment, the location update request is explained as information indicating the mode, another information may be used. That is, the transmission unit 14 of the wireless terminal 10 transmits information indicating the mode of the wireless terminal 10 to the base station apparatus 20. The base station apparatus 20 sets any one of the first mode or the second mode based on the information indicating the mode of the wireless terminal 10. When the base station apparatus 20 sets the first mode, the base station apparatus 20 can also set the length of the second period UI based on the information indicating the mode of the wireless terminal 10.

Embodiment 4

Figure 10:
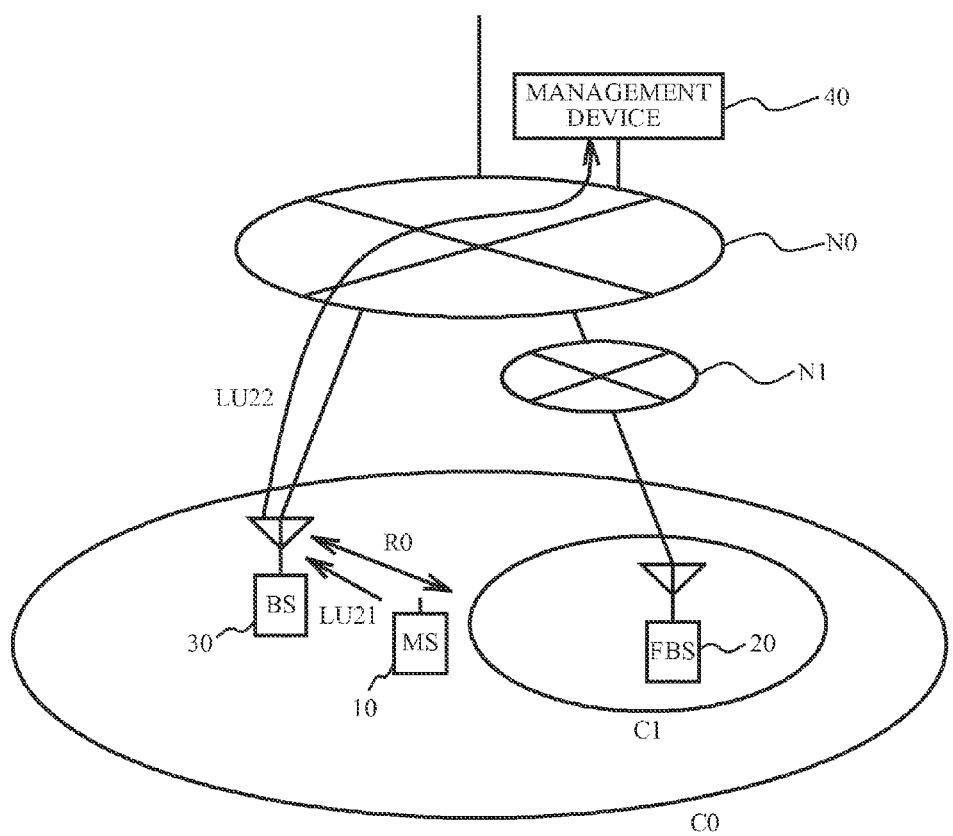
FIG. 10 is a schematic diagram of the communication system according to a fourth embodiment.

A fourth embodiment illustrates an example when the wireless terminal executes the location update via the base station apparatus 30. FIG. 10 is a schematic diagram of the communication system according to the fourth embodiment. As illustrated in FIG. 10, the wireless terminal 10 moves near the base station apparatus 30. The wireless terminal 10 transmits a location update request L21 to the base station apparatus 30. The base station apparatus 30 transmits a location update request L22 to the management device 40 via the network N0. The other construction of the communication system is the same as the construction of FIG. 1 of the first embodiment, and therefore description thereof is omitted.

Figure 11:
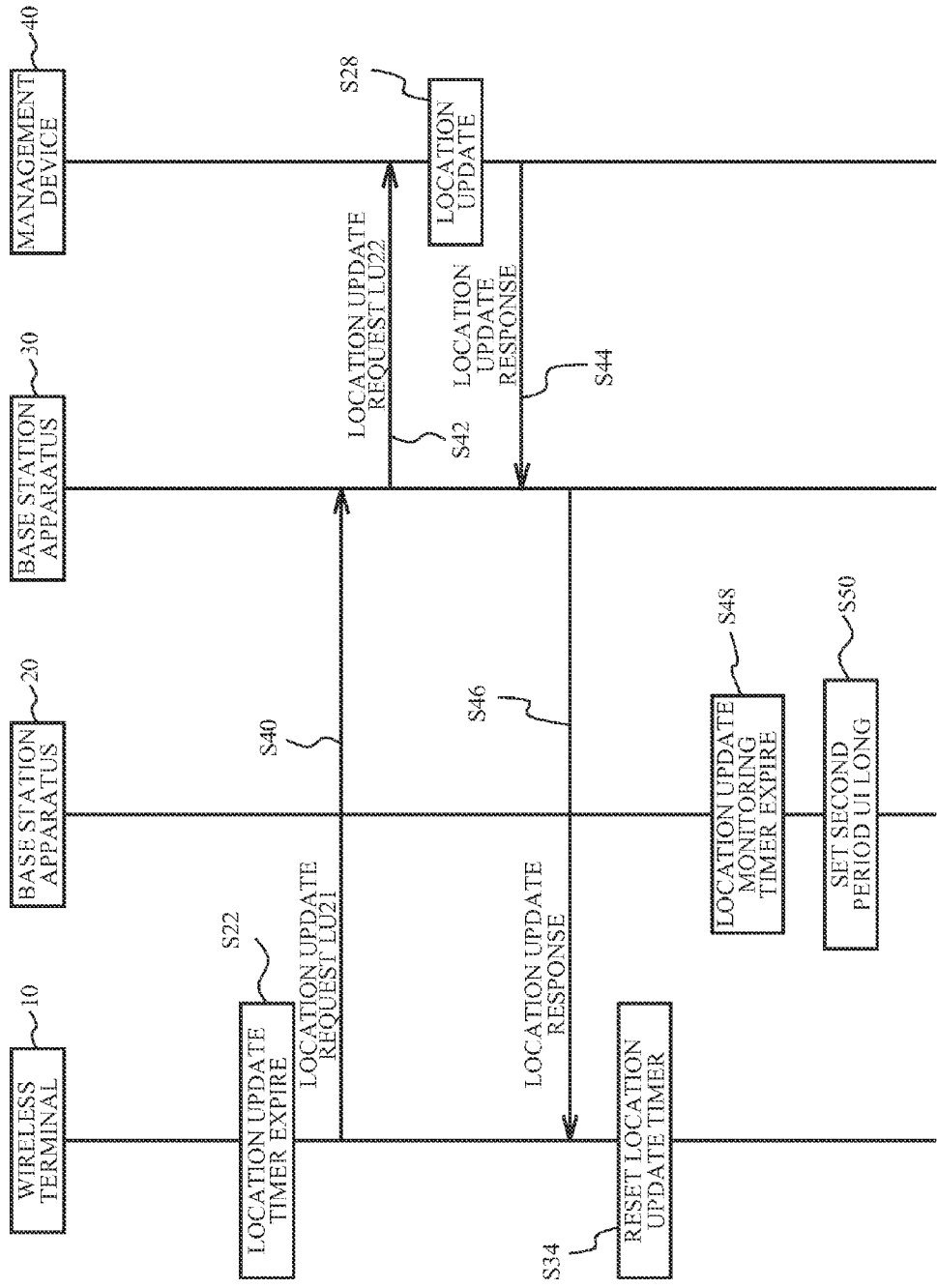
FIG. 11 is a sequence diagram of the communication system according to the fourth embodiment.

FIG. 11 is a sequence diagram of the communication system according to the fourth embodiment. The location update timer of the wireless terminal 10 expires (step S22). The wireless terminal 10 transmits the location update request L21 including an identifier of the wireless terminal 10 to the base station apparatus 30 (step S40). The base station apparatus 30 transmits the location update request L22 including the identifier of the wireless terminal 10 and an identifier of the base station apparatus 30 to the management device 40 (step S42). The management device 40 updates the paging group in which the wireless terminal 10 is located with the paging group to which the base station apparatus 30 belongs, based on the identifiers of the wireless terminal 10 and the base station apparatus 30 (step S28).

The management device 40 reports the completion of the location update to the base station apparatus 30 (step S44). The base station apparatus 30 reports the completion of the location update to the wireless terminal 10 (step S46). The wireless terminal 10 resets the location update timer (step S34). In the base station apparatus 20, the location update monitoring timer expires (step S24). The base station apparatus 20 sets the second period UI long (step S50).

According to the fourth embodiment, when the determination unit 26 does not detect the location update request from the wireless terminal 10 for a given period after the determination unit 26 resets the location update monitoring timer in step S38 of FIG. 9, as illustrated in steps S48 and S50 of FIG. 11, the determination unit 26 can determine that the wireless terminal 10 of the idle mode does not exist in the service area. Thereby, the determination unit 26 can easily determine that the wireless terminal of the idle mode does not exist in the service area.

Embodiment 5

Figure 12:
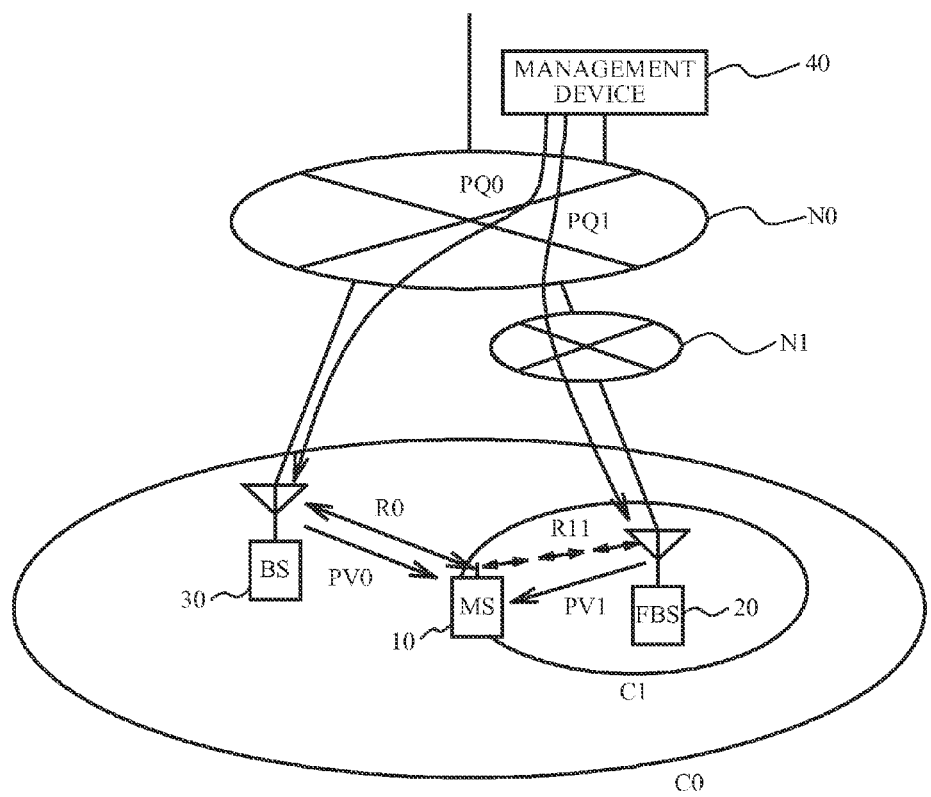
FIG. 12 is a schematic diagram of the communication system according to a fifth embodiment.

A fifth embodiment illustrates an example when the management device 40 executes a paging request. For example, a paging advertisement message is used as a transmission request for requesting transmission of the location update request. FIG. 12 is a schematic diagram of the communication system according to the fifth embodiment. As described above, the management device 40 registers the wireless terminal 10 in the paging group. The management device 40 transmits paging request messages PQ0 and PQ1 to the base station apparatuses 20 and 30 included in the paging group, when the radio terminal 10 has received a signal, or periodically. The base station apparatuses 20 and 30 broadcast paging advertisement messages PV0 and PV1 into communication areas of the base station apparatuses 20 and 30, respectively. The wireless terminal 10 of the idle mode intermittently receives a signal from the base station apparatus 20 or 30, and receives the paging advertisement message PV0 or PV1. In the paging advertisement message, an action code for designating an identifier that identifies a wireless terminal and an action to be executed is included. The action code is, for example, the location update, connection to the network, or the like.

In FIG. 12, the wireless terminal 10 receives the paging advertisement message that requests a report of the location update request from the base station apparatus 20. Then, the wireless terminal 10 transmits the location update request to the management device 40, as is the case with the third embodiment.

Figure 13:
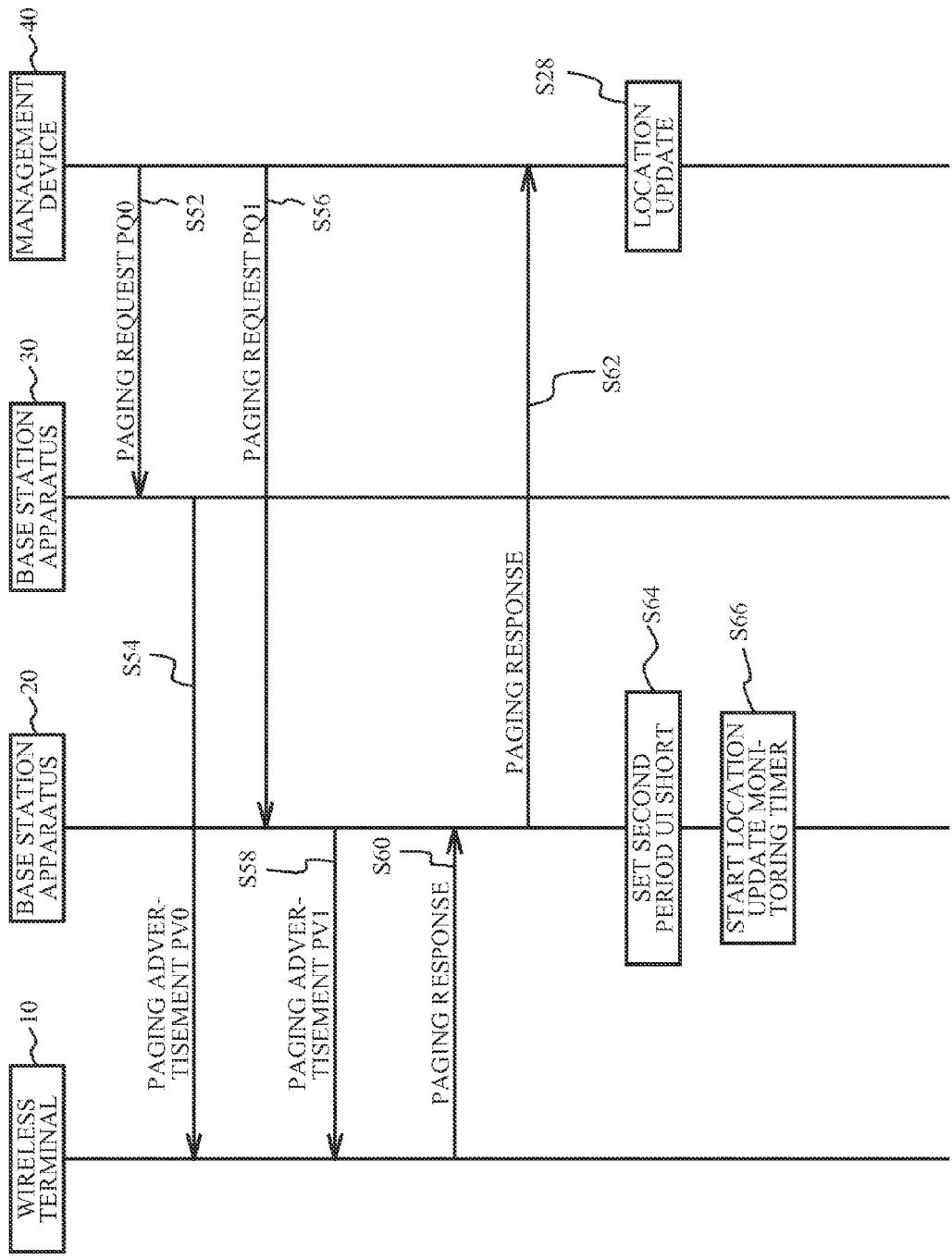
FIG. 13 is a sequence diagram of the communication system according to the fifth embodiment.

FIG. 13 is a sequence diagram of the communication system according to the fifth embodiment. The management device 40 transmits the paging request messages PQ0 and PQ1 to the base station apparatuses 30 and 20, respectively (steps S52 and S56). The base station apparatuses 30 and 20 transmits the paging advertisement messages PV0 and PV1 to the respective communication areas (steps S54 and S58). The wireless terminal 10 of the idle mode belongs in the cell C1 of the base station apparatus 20. When the wireless terminal 10 of the idle mode receives the paging advertisement message, the wireless terminal 10 transmits a paging response message to the belonging base station apparatus 20 (step S60). The base station apparatus 20 transmits the paging response message to the management device 40 (step S62). The paging response message is the location update request LU11 or LU12 of the third embodiment, for example. The management device 40 executes the location update of the wireless terminal 10 (step S28). When the base station apparatus 20 receives the paging response message from the wireless terminal 10, the base station apparatus 20 sets the second period UI short (step S64). The base station apparatus 20 activates the location update monitoring timer (step S66).

Figure 14:
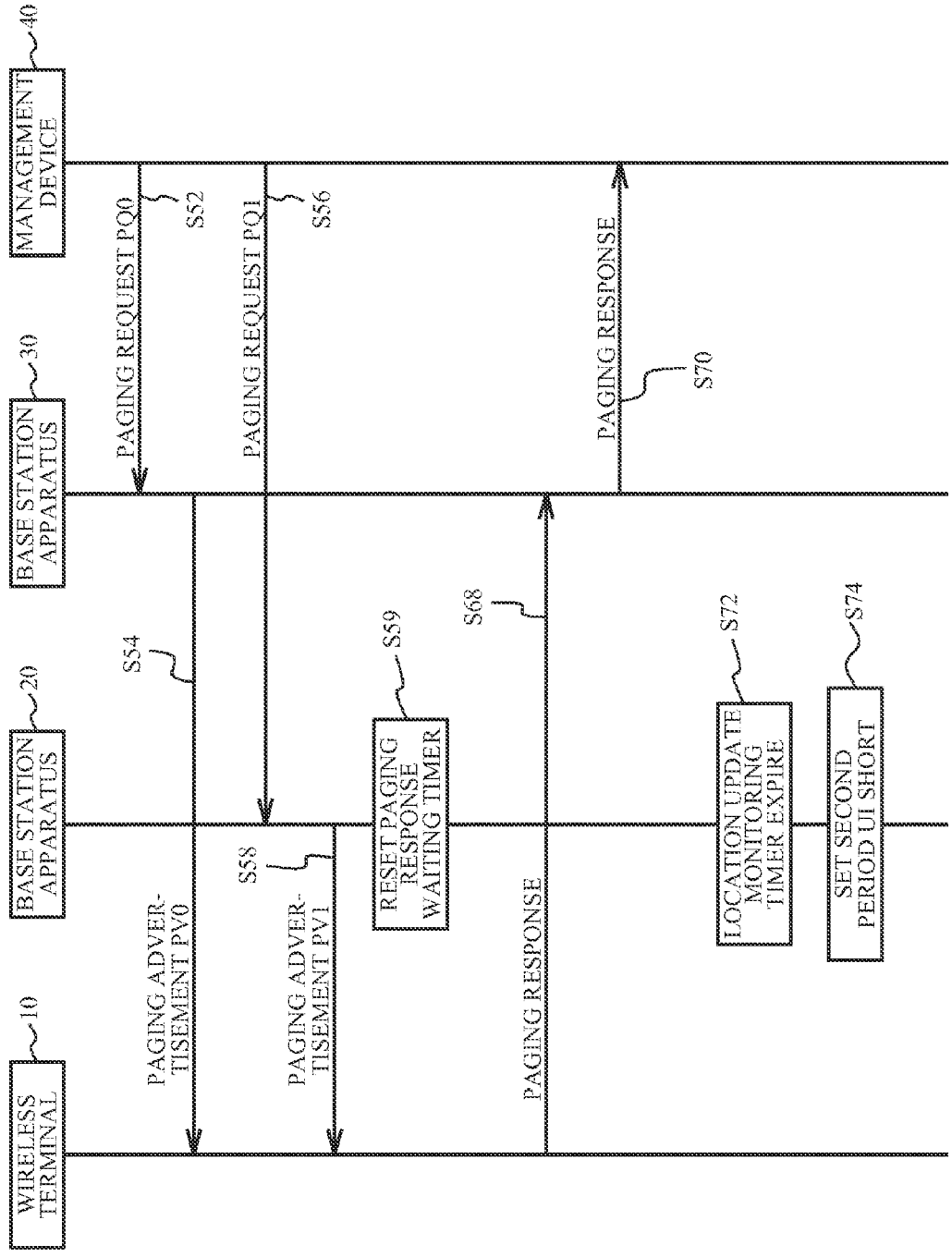
FIG. 14 is another sequence diagram of the communication system according to the fifth embodiment.

FIG. 14 is another sequence diagram of the communication system according to the fifth embodiment. Steps S52 to S58 are the same as those of FIG. 13, and therefore description thereof is omitted. The determination unit 26 of the base station apparatus 20 broadcasts the paging advertisement message in step S58, and then the determination unit 26 resets a paging response waiting timer (step S59). The wireless terminal 10 of the idle mode belongs in the cell C0 of the base station apparatus 30. When the wireless terminal 10 of the idle mode receives the paging advertisement message, the wireless terminal 10 of the idle mode transmits the paging response message to the belonging base station apparatus 30 (step S68). The base station apparatus 30 transmits the paging response message to the management device 40 (step S70). When a certain period has elapsed after the reset of the paging response waiting timer of step S59, the base station apparatus 20 detects the expiration of the paging response waiting timer (step S72). The setting unit 27 of the base station apparatus 20 of step S59 sets the second period UI long (step S74).

According to the fifth embodiment, the transmission unit 22 of the base station apparatus 20 transmits a transmission request (e.g. the paging response message) for requesting the transmission of the location update request, to the wireless terminal 10, as illustrated in step S58. When the determination unit 26 detects the paging response message (e.g. the location update request) from the wireless terminal 10, the determination unit 26 determines that the wireless terminal 10 of the idle mode exists in the service area. Moreover, when the determination unit 26 does not detect the location update request for the certain period, as illustrated in steps S72 and S74 of FIG. 14, the determination unit 26 determines that the wireless terminal 10 of the idle mode does not exist in the service area, and the setting unit 27 sets the second period UI long. Thereby, the determination unit 26 can easily determine whether the wireless terminal 10 of the idle mode exists in the service area.

Embodiment 6

Figure 15:
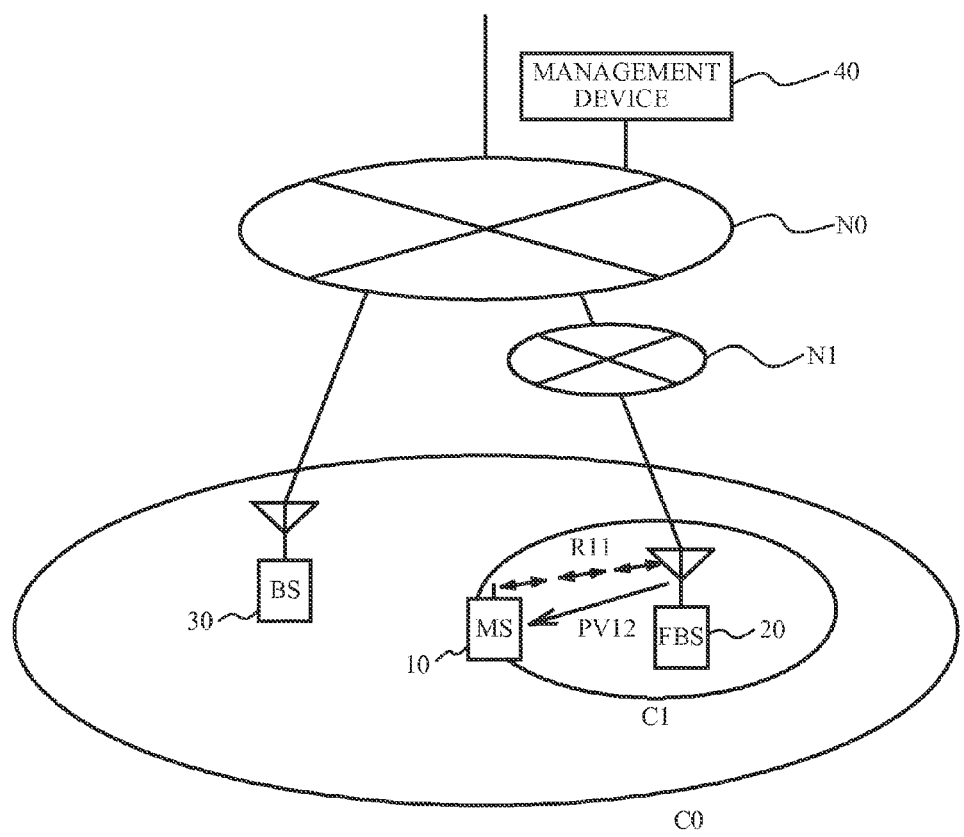
FIG. 15 is a schematic diagram of the communication system according to a sixth embodiment.

A sixth embodiment illustrates an example when the base station apparatus executes the paging to the wireless terminal of the idle mode. FIG. 15 is a schematic diagram of the communication system according to the sixth embodiment. Even when the base station apparatus 20 receiver the paging request message PQ1 from the management device 40 as illustrated in FIG. 12 of the sixth embodiment, the base station apparatus 20 uniquely broadcasts the paging advertisement message PV12 into the cell C1, as illustrated in FIG. 15. Here, the unique paging advertisement message is called "dummy paging".

Figure 16:
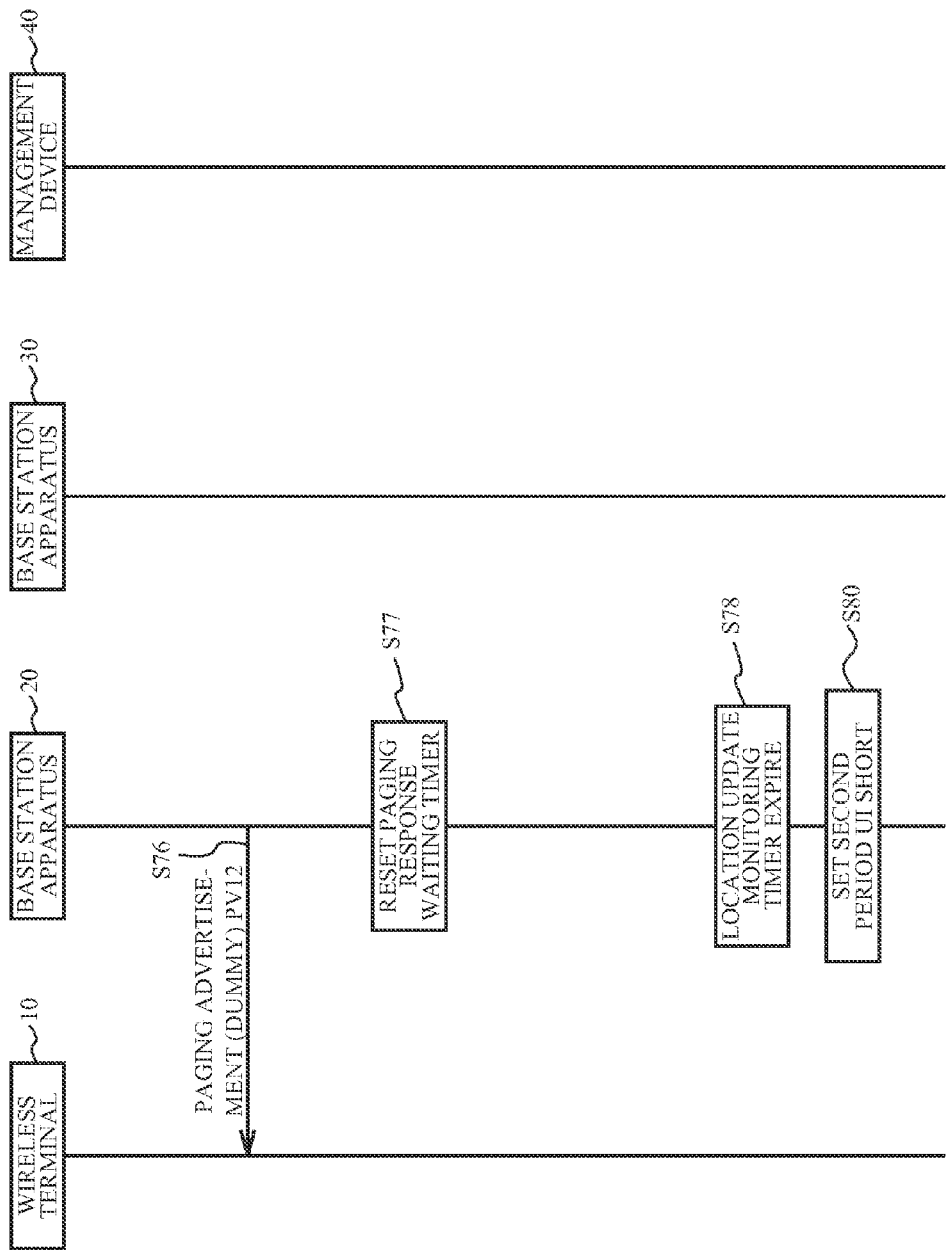
FIG. 16 is a sequence diagram of the communication system according to the sixth embodiment.

FIG. 16 is a sequence diagram of the communication system according to the sixth embodiment. The base station apparatus 20 broadcasts a dummy paging advertisement message PV12 (step S76). The determination unit 26 resets the paging response waiting timer (step S77). When the wireless terminal 10 of the idle mode does not exist in the service area, the wireless terminal 10 dose not react. When a certain period has elapsed after the determination unit 26 of the base station apparatus 20 broadcasted the dummy paging advertisement message, the determination unit 26 detects the expiration of the paging response waiting timer (step S78). The determination unit 26 determines that the wireless terminal of the idle mode does not exist in the service area. The setting unit 27 sets the second period UI long (step S78).

Figure 17:
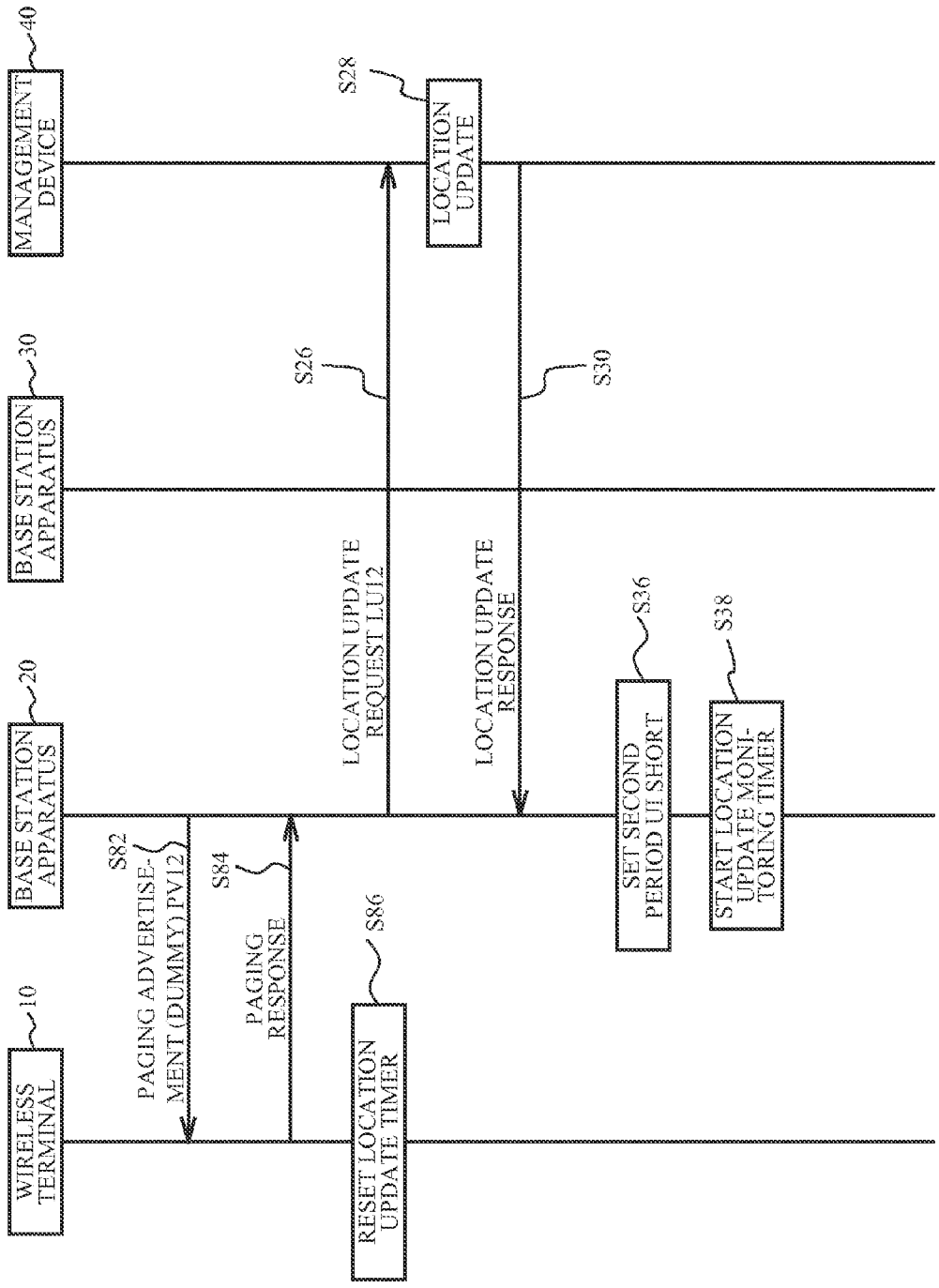
FIG. 17 is another sequence diagram of the communication system according to the sixth embodiment.

FIG. 17 is another sequence diagram of the communication system according to the sixth embodiment. The base station apparatus 20 broadcasts the dummy paging advertisement message PV12 (step S82). The wireless terminal 10 of the idle mode exists in the service area of the base station apparatus 20. The wireless terminal 10 transmits the paging response message to the base station apparatus 20 (step S84). The wireless terminal 10 resets the location update timer (step S86). Steps S26 to S30, S36 and S38 are the same as those of FIG. 9, and therefore description thereof is omitted.

According to the sixth embodiments, the base station apparatus 20 uniquely broadcasts dummy paging advertisement message at regular intervals or irregular intervals, and can confirm whether the wireless terminal 10 exists in the service area of the base station apparatus 20. In addition, after the base station apparatus 20 is turned on, the base station apparatus 20 can also execute dummy paging in order to confirm the wireless terminal 10 of the idle mode in the service area, for example.

When the base station apparatus 20 can communicate with a specific wireless terminal 10, for example, the base station apparatus 20 includes a list of identifiers of connectable wireless terminals 10. The base station apparatus 20 can execute the dummy paging only to the wireless terminals 10 included in the list. In this case, the dummy paging is the same as the paging advertisement based on the paging request by the management device 40, the base station apparatus 20 can execute the dummy paging by using the same function.

For example, there is a case where the base station apparatus 20 can communicate with not only the specific wireless terminal 10 but also unspecified wireless terminals. In this case, the base station apparatus 20 can also execute the dummy paging to all wireless terminals by using a particular identifier indicating many unspecified wireless terminals.

Thus, the transmission unit 22 can transmit the transmission request (e.g. the paging advertisement request) to the wireless terminal 10 in which connection with the base station apparatus 20 is permitted. In addition, the transmission unit 22 can also transmit the transmission request (e.g. the paging advertisement request) to many unspecified wireless terminals. In this case, the reception unit 12 of the wireless terminal 10 receives the transmission request for requesting the wireless terminal 10 to transmit the location update request, from the base station apparatus 20.

When the received transmission request is for unspecified wireless terminals, the transmission unit 14 can transmit the location update request to the base station apparatus 20.

Embodiment 7

Figure 18:
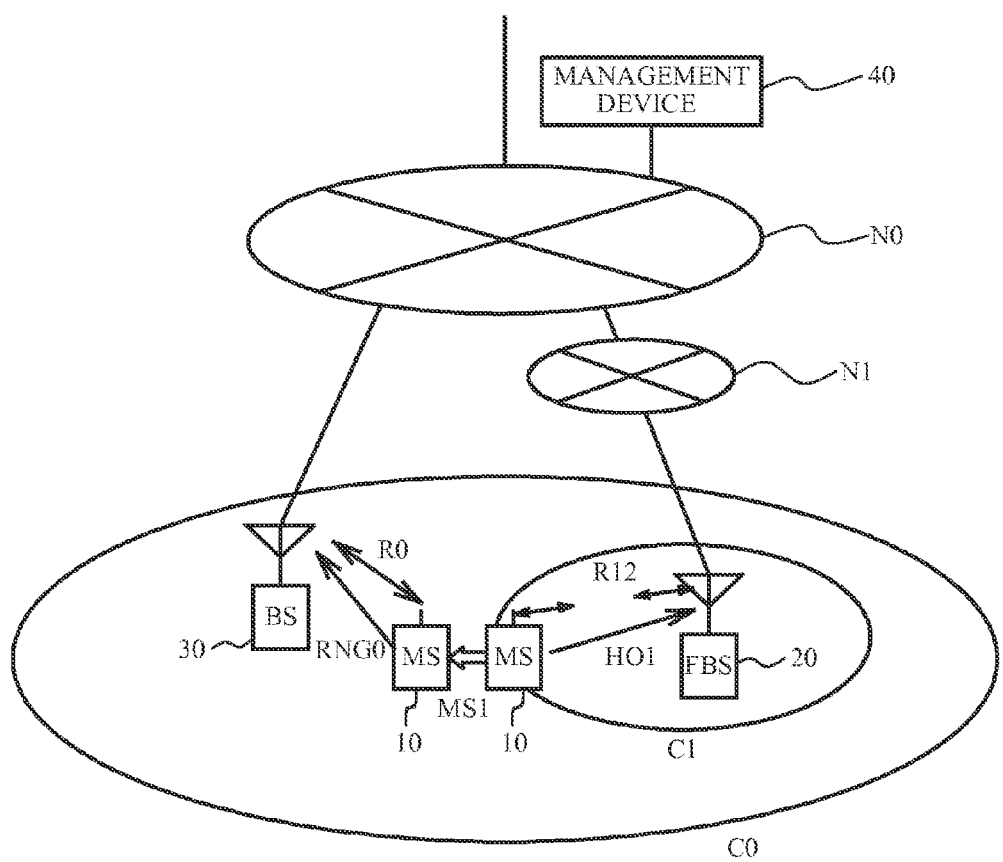
FIG. 18 is a schematic diagram of the communication system according to a seventh embodiment.

A seventh embodiment illustrates an example when the wireless terminal accessing the base station apparatus executes handover. FIG. 18 is a schematic diagram of the communication system according to the seventh embodiment. When the wireless terminal 10 accessing the base station apparatus 20 keeps away from the cell C1 of the base station apparatus 20, a receiving level of the wireless signal from the base station apparatus 20 is lower than that of the wireless signal from the base station apparatus 30. The wireless terminal 10 transmits a handover execution message HO1 to the base station apparatus 20. Thereby, the wireless terminal 10 notifies the base station apparatus 20 of the handover execution to another base station apparatus. The wireless terminal 10 transmits a connection request message RNG0 to the base station apparatus 30. At this time, the determination unit 26 of the base station apparatus 30 determines that the wireless terminal of the normal mode does not exist in the service area.

Figure 19:
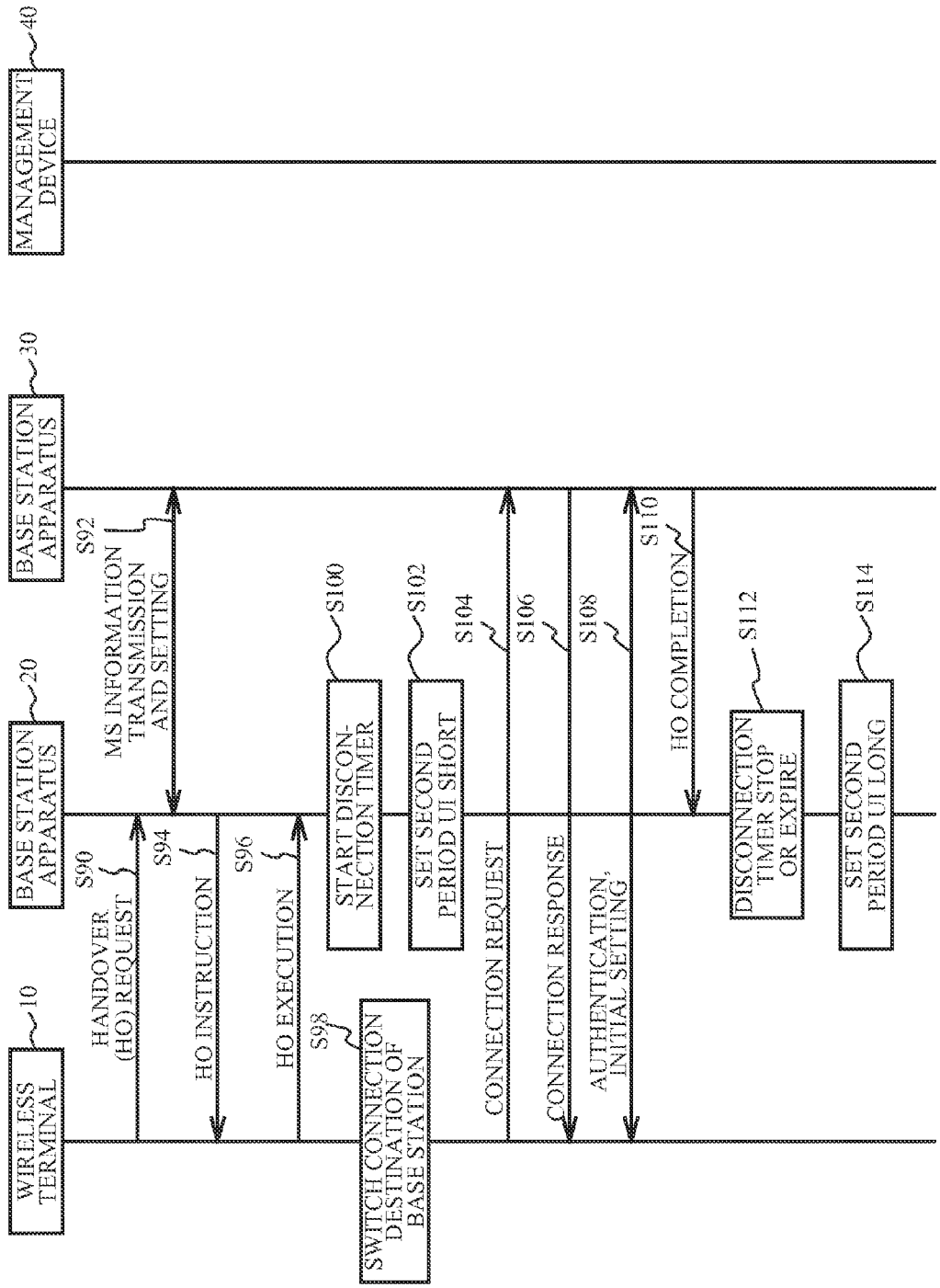
FIG. 19 is a sequence diagram of the communication system according to the seventh embodiment.

FIG. 19 is a sequence diagram of the communication system according to the seventh embodiment. Since the wireless terminal 10 of the normal mode exists in the service area of the base station apparatus 20, the base station apparatus 20 is set to the second mode. When the wireless terminal 10 of the normal mode keeps away from the base station apparatus 20, the wireless terminal 10 executes a handover request to the base station apparatus 20 (step S90). When the base station apparatus 20 requests the handover, step S90 may not be executed. The base station apparatus 20 exchanges a control message for the base station apparatus 30 which is a handover destination (step S92). Thereby, the transfer of context information on the wireless terminal 10, and the assignment of a wireless resource to be used in the case of the connection request may be executed.

The base station apparatus 20 transmits a handover instruction message to the wireless terminal 10 (step S94). Thereby, the base station apparatus 20 notifies the wireless terminal 10, of a handover execution permission, a base station apparatus of the handover destination, a wireless resource assigned to the handover, and the like. The wireless terminal 10 transmits a handover execution message to the base station apparatus 20 (step S96). Thereby, the wireless terminal 10 begins the handover. When the base station apparatus 20 receives the handover execution message, the base station apparatus 20 activates a disconnection timer (step S100). The disconnection timer is used until the transmission and the reception from/to the wireless terminal 10 is disconnected. When the setting unit 27 of the base station apparatus 20 receives the handover execution message, the setting unit 27 sets the first mode and may set the second period UI short (step S102).

The wireless terminal 10 switches a connection destination to the base station apparatus 30, receives the wireless signal from the base station apparatus 30, and executes establishment of the synchronous and acquisition of connection parameters (step S98). The wireless terminal 10 transmits a connection request to the base station apparatus 30 (step S104). At this time, the wireless resource acquired in step S94 may be used. The base station apparatus 30 transmits a connection response to the wireless terminal 10 (step S106). Thereby, the base station apparatus 30 transmits adjustment parameters of connection permission or non-permission, transmission power and transmission timing to the wireless terminal 10. The wireless terminal 10 and the base station apparatus 30 further execute initial setting of the connection, such as negotiation of authentication and operation parameters (step S108). When the connection between the base station apparatus 30 and the wireless terminal 10 is completed, the base station apparatus 30 notifies the base station apparatus 20 of the completion of the handover (step S110).

When the base station apparatus 20 receives the completion of the handover, the base station apparatus 20 stops the disconnection timer activated in step S100 (step S112). Thereby, the base station apparatus 20 stops assigning the wireless resource to the wireless terminal 10. When the base station apparatus 20 cannot receive the completion of the handover of step S110 for the reason of failure of the handover, the base station apparatus 20 stops assigning the wireless resource to the wireless terminal 10 if the disconnection timer expires. The determination unit 26 of the base station apparatus 20 determines that the wireless terminal of the normal mode does not exist in the service area. In addition, when the wireless terminal 10 of the sleep mode or the idle mode does not exist in the service area, the setting unit 27 sets the second period UI long (step S114). When the setting unit 27 changes the setting from the second mode to the first mode in step S102, the setting unit 27 maintains the first mode and sets the second period UI long. On the other hand, when the setting unit 27 does not change the setting from the second mode to the first mode in step S102, the setting unit 27 change the setting to the first mode and sets the second period UI long.

As described in the seventh embodiment, when the determination unit 26 determines that the wireless terminal 10 of the normal mode in the service area executes the handover to another base station apparatus, and when another wireless terminal of the normal mode does not exist in the service area, the setting unit 27 sets the setting to the first mode. In addition, when the wireless terminal 10 of the sleep mode or the idle mode does not exist in the service area, the setting unit 27 can set the second period UI long.

Embodiment 8

Figure 20:
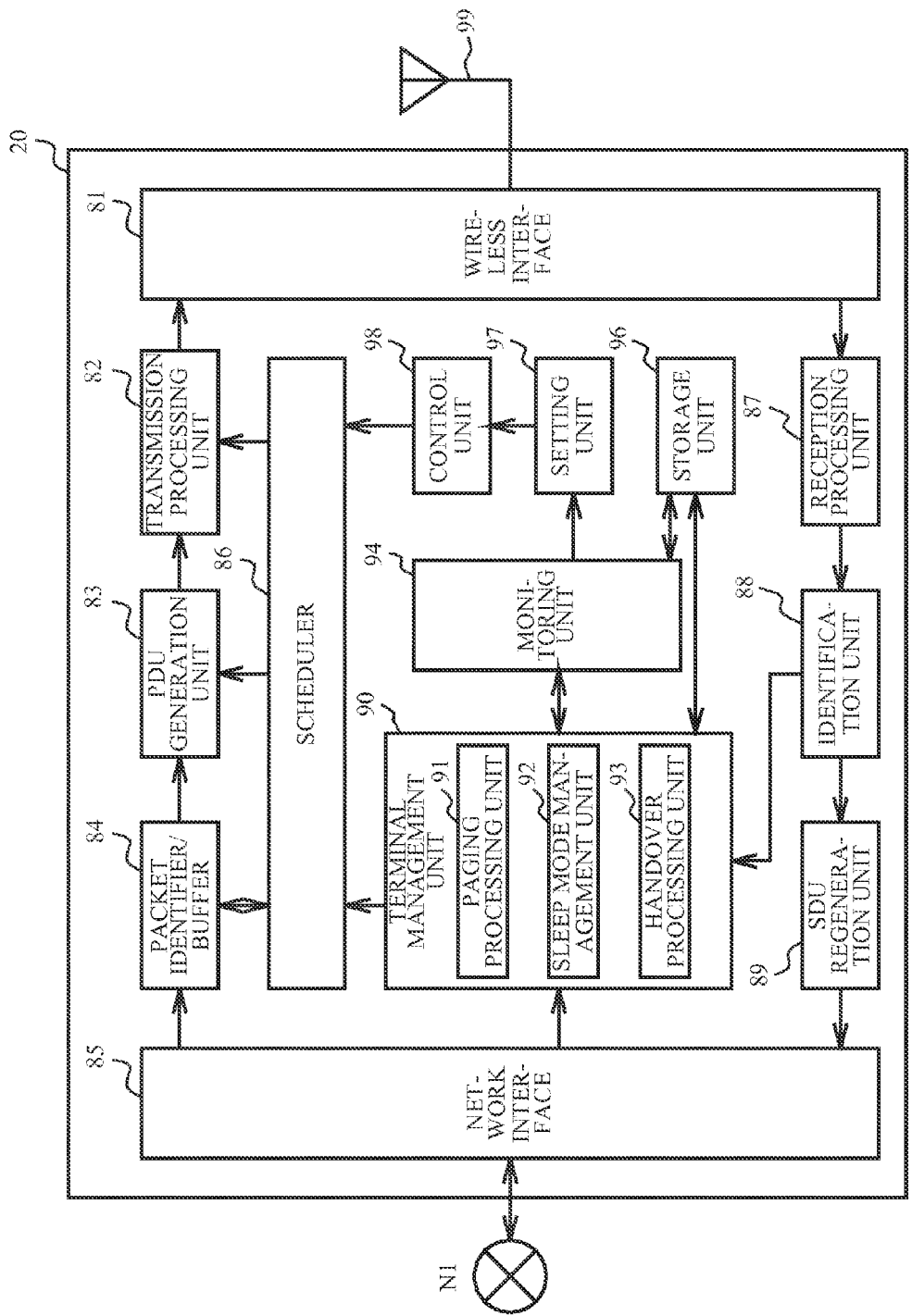
FIG. 20 is a functional diagram of the base station apparatus 20 according to an eighth embodiment.

An eighth embodiment is an example including the second to seventh embodiments. FIG. 20 is a functional diagram of the base station apparatus 20 according to the eighth embodiment. As illustrated in FIG. 20, the base station apparatus 20 includes an antenna 99. The antenna 99 transmits and receives the electric wave to/from the wireless terminal. A wireless interface 81 for executing the transmission and reception is connected to the antenna 99. When the base station apparatus is used for a WiMAX network, for example, the wireless interface 81 is based on IEEE802.16 standards, and wireless frames are transmitted according to OFDM (Orthogonal Frequency Division Multiplexing) and OFDMA (Orthogonal Frequency Division Multiple Access). The transmission unit 22 and the reception unit 24 of the first embodiment correspond to the wireless interface 81, for example.

A network interface 85 receives a DL (Down Link) packet (i.e., a packet for the wireless terminal 10) from the network N1. The network interface 85 transmits an UL (Up Link) packet (i.e., a packet for a wireless communication carrier network). A packet identifier/buffer 84 identifies a packet for each wireless terminal 10 and each connection, and temporarily stores the identified packet as SDU (Service Data Unit) into a buffer. A scheduler 86 checks the packet stored into the buffer, and assigns a slot in a DL subframe to the packet, i.e., assigns a transmission slot to the SDU waiting to be transmitted. For example, in the case of the WiMAX, MAP information is generated as a result of the assignment of the transmission slot. A PDU (Protocol Data unit) generation unit 83 converts the SDU assigned to the transmission slot into the PDU. Thereby, a MAC (Media Access Control) header and a CRC (Cyclic Redundancy Check) code is added. A transmission processing unit 82 encodes the PDU, modulates, and generates the wireless frames. The processed wireless signal is transmitted from the wireless interface 81 to the wireless terminal via the antenna 99.

The wireless signal of UL received by the wireless interface 81 is output to a reception processing unit 87. The reception processing unit 87 extracts the reception frame from the wireless signal, and executes demodulation and multiplexing. An identification unit 88 distributes a control message and user data. A SDU regeneration unit 89 converts the user date from the PDU to the SDU. Thereby, defragment, depacking, a MAC header and a CRC code are removed from the PDU. The network interface 85 transmits the SDU to the network N1.

A terminal management unit 90 executes a connection process or a disconnection process of the wireless terminal 10, and manages a connected wireless terminal and its state. The terminal management unit 90 includes a paging processing unit 91, a sleep mode management unit 92, and a handover processing unit 93. The paging processing unit 91 generates the advertisement message based on the paging request message received from the management device 40 (paging controller) via the network interface, as illustrated in the fifth embodiment. The paging processing unit 91 broadcasts the advertisement message via the wireless interface 81. In addition, the paging processing unit 91 executes the dummy paging by using the list of the wireless terminals or the identifier indicating many unspecified wireless terminals, as illustrated in the sixth embodiment.

The sleep mode management unit 92 controls beginning and stop of the sleep mode of the wireless terminal 10, manages parameters of the sleep mode, and executes the setting to the scheduler 86. For example, the sleep mode management unit 92 manages parameters such as a listening window which is the communicable period, and a sleep window which is the incommunicable period. The handover processing unit 93 executes negotiation with the base station (e.g. base station apparatus 30) which is a candidate for a destination of the handover, gives an instruction of the handover to the wireless terminal 10, and executes separation after the execution of the handover, as illustrated in the seventh embodiment.

A monitoring unit 94 monitors the terminal management unit 90, and detects an event of transition from the normal mode to the sleep mode or the idle mode, an event of existence or nonexistence of the response to the paging, and events of execution and completion of the handover. The determination unit 26 of the first embodiment is the terminal management unit 90 and the monitoring unit 94, for example.

The setting unit 27 of the first embodiment is a setting unit 97, for example. The setting unit 27 executes the setting of the first mode, the second mode, and the second period in response to a trigger composed of at least one above-mentioned event detected by the monitoring unit 94.

A control unit 98 controls the scheduler 86 so as to transmit and receive a signal to/from the wireless interface 81, based on the mode and the period set by the setting unit 97.

Information on the connected wireless terminal 10, the list of the wireless terminals 10 in which connection with the base station apparatus is permitted, and the identifiers indicating many unspecified wireless terminals, and so on are stored into a storage unit 96.

Figure 21:
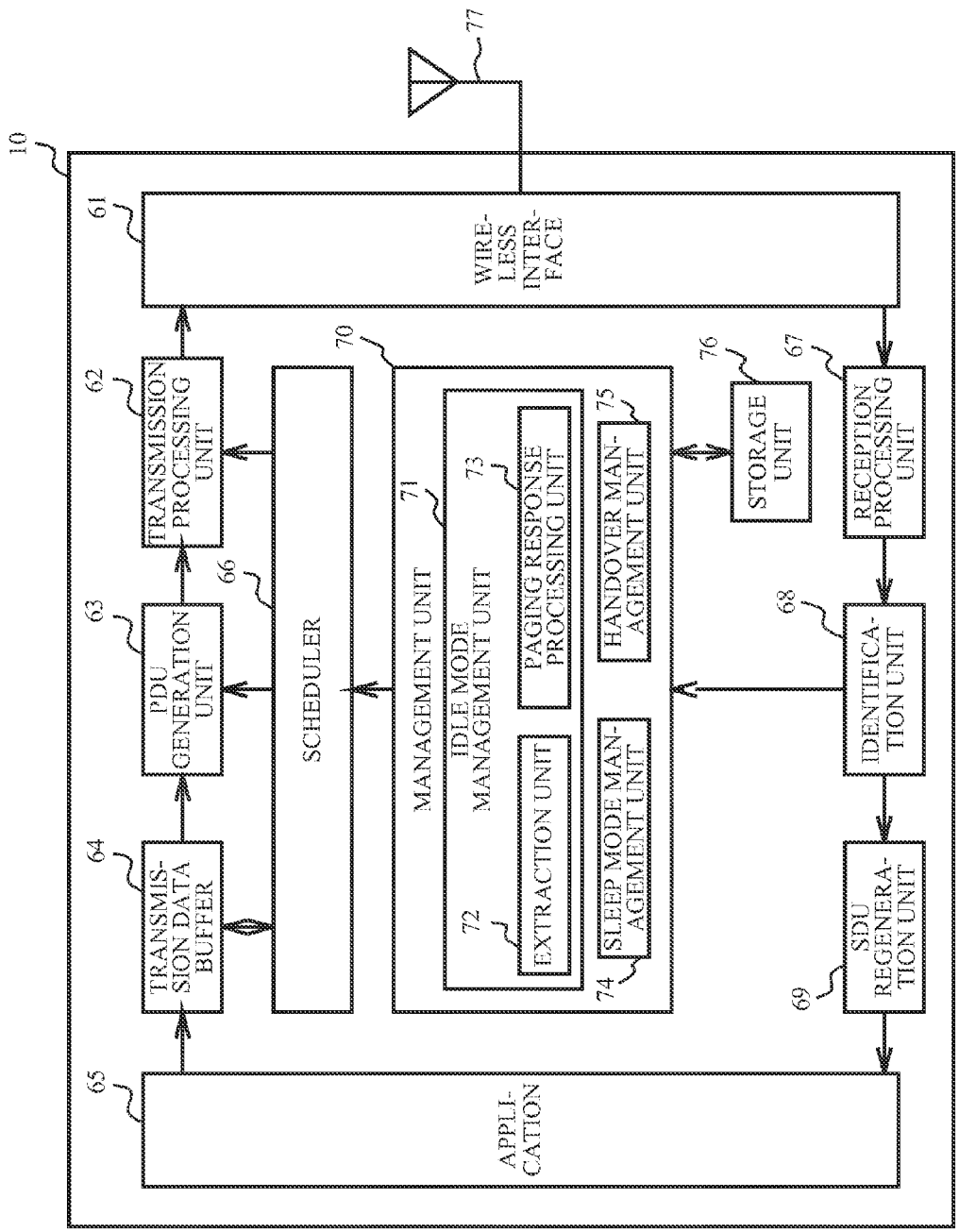
FIG. 21 is a functional diagram of the wireless terminal 10 according to the eighth embodiment.

FIG. 21 is a functional diagram of the wireless terminal according to the eighth embodiment. The wireless terminal 10 includes an antenna 77, a wireless interface 61, an application 65, a scheduler 66, a transmission processing unit 62, a PDU generation unit 63, a transmission data buffer 64, a reception processing unit 67, an identifying unit 68, and a SDU regeneration unit 69, as illustrated in FIG. 21. The application 65 executes applications of a telephone function and a communication function in the wireless terminal 10. The operation of each component in the case of transmitting and receiving data to/from the application 65 is the same as that of corresponding component of the base station apparatus 20 of FIG. 20, and therefore description thereof is omitted.

The management unit 16 of FIG. 3 in the first embodiment corresponds to a management unit 70 of FIG. 21. The control message received from the base station apparatus 20 is distributed to the management unit 70 by the identifying unit 68. The management unit 70 manages the connection process or disconnection process to the base station apparatus 20. In addition, the management unit 70 includes an idle mode management unit 71, a sleep mode management unit 74, and a handover management unit 75. The idle mode management unit 71 begins and completes the idle mode of the wireless terminal 10. The idle mode management unit 71 includes an extraction unit 72 and a paging response processing unit 73. As illustrated in the sixth embodiment, the extraction unit 72 extracts the identifier and the action code of the wireless terminal 10 in which the paging should be executed, from the received paging advertisement message. When the identifier indicates the self-wireless terminal or many unspecified wireless terminals, the paging response processing unit 73 executes a response process depending on the action code. For example, the paging response processing unit 73 transmits a register update request to the base station apparatus.

The sleep mode management unit 74 controls beginning and completing the sleep mode of the wireless terminal 10, manages operation parameters of the sleep, and manages the scheduler 66. The handover management unit 75 transmits a handover request and a handover execution message to the base station apparatus (e.g. base station apparatus 30), switches the base station apparatus (e.g. base station apparatus 30) which is a destination of the connection, and executes a reconnection process to the base station apparatus which is a destination of the handover, as illustrated in the seventh embodiment.

Information on the connected wireless terminal, the list of the wireless terminals in which connection with the base station apparatus is permitted, and the identifiers indicating many unspecified wireless terminals, and so on are stored into a storage unit 76.

Figure 22:
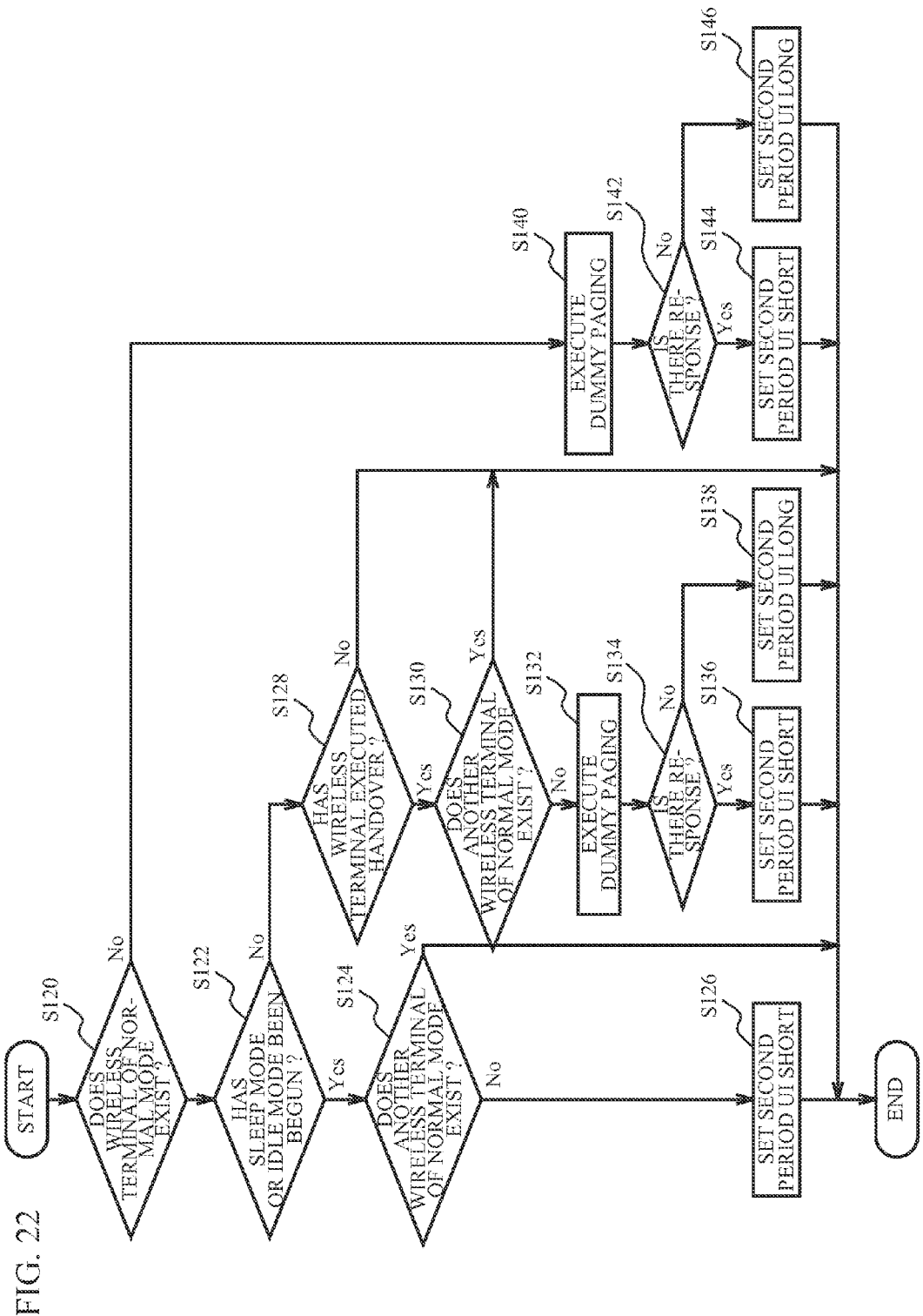
FIG. 22 is a flowchart illustrating a process of the base station apparatus 20 according to the eighth embodiment (example 1)

FIG. 22 is a flowchart illustrating a process of the base station apparatus 20 according to the eighth embodiment. It is assumed that the setting unit 97 sets the second mode. The monitoring unit 94 monitors the terminal management unit 90, and determines whether the connected wireless terminal of the normal mode exists in the service area (step S120). When the determination of step S120 is YES, the monitoring unit 94 monitors the paging processing unit 91 and the sleep mode management unit 92 in the terminal management unit 90, and determines whether the wireless terminal of the normal mode has begun the sleep mode or the idle mode (step S122). When the determination of step S122 is YES, the monitoring unit 94 determines whether another connected wireless terminal of the normal mode exists (step S124). When the determination of step S124 is NO, the setting unit 97 sets the first mode, and sets the second period UI short (step S126). When the determination of step S124 is YES, the setting unit maintains the second mode since the wireless terminal of the normal mode exists in the service area.

When the determination of step S122 is NO, the monitoring unit 94 monitors the handover processing unit 93, and determines whether the wireless terminal of the normal mode has executed the handover (step S128). When the determination of step S128 is YES, the monitoring unit 94 determines whether another wireless terminal of the normal mode exists in the service area (step S130). When the determination of step S130 is NO, the monitoring unit 94 causes the paging processing unit 91 to execute the dummy paging in order to detect whether the wireless terminal of the idle mode exists in the service area (step S132). The monitoring unit 94 determines whether there is a response to the dummy paging (step S134). When the determination of step S134 is YES, the wireless terminal of the normal mode does not exist in the service area, and the wireless terminal of the idle mode exists in the service area. Therefore, the setting unit 97 sets the first mode and sets the second period short (step S136). When the determination of step S134 is NO, the wireless terminal of the normal mode and the wireless terminal of the idle mode do not exist in the service area. Therefore, the setting unit 97 sets the first mode and sets the second period long (step S138).

When the determination of step S128 is NO or the determination of step S130 is YES, the connected wireless terminal of the normal mode exists in the service area, and hence the setting unit 97 maintains the second mode.

When the determination of step S120 is NO, the monitoring unit 94 causes the paging processing unit 91 to execute the dummy paging in order to detect whether the wireless terminal of the idle mode exists in the service area (step S140). Steps S142 to S146 are the same as steps S134 to S138, respectively, and therefore description thereof is omitted.

Figure 23:
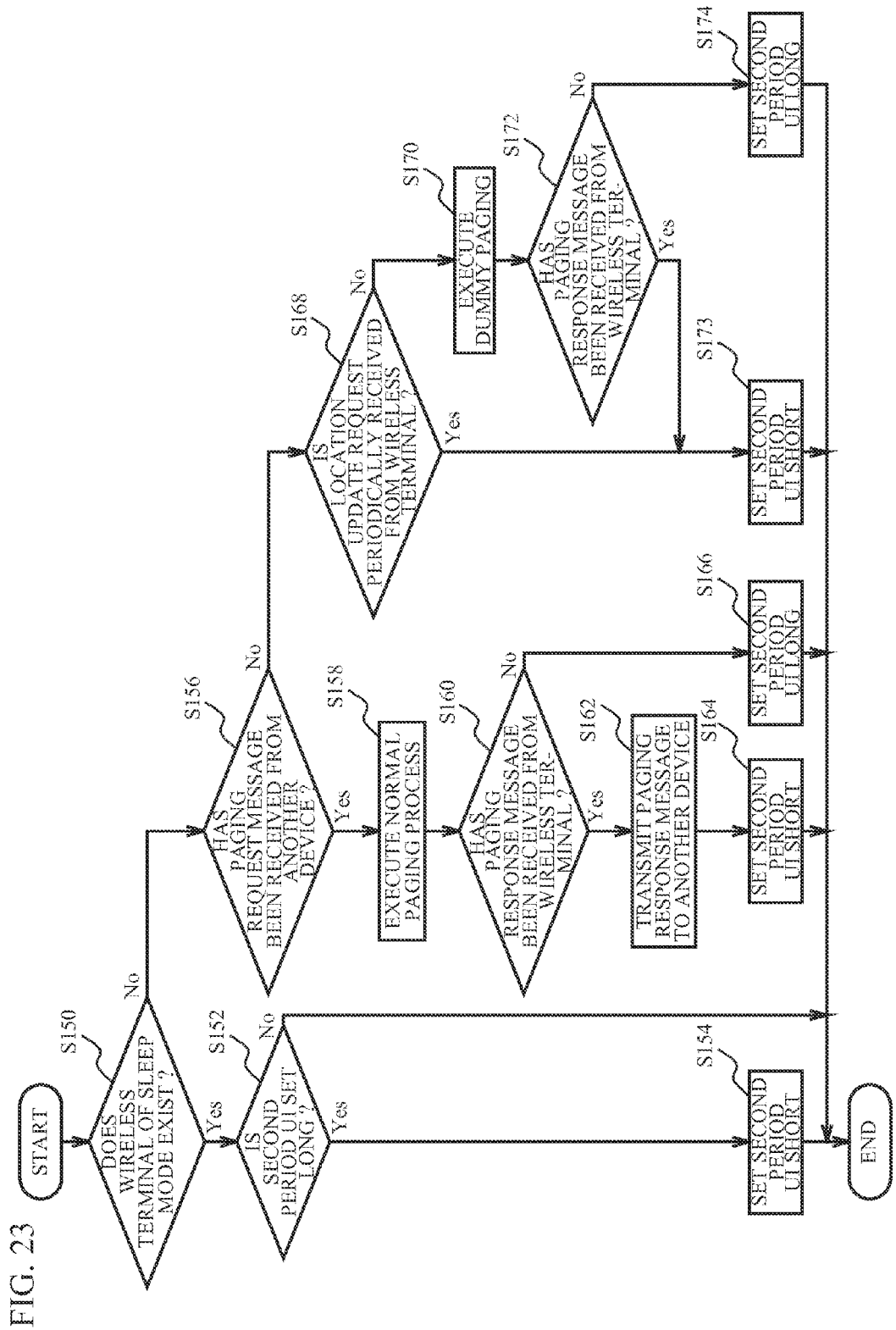
FIG. 23 is a flowchart illustrating a process of the base station apparatus 20 according to the eighth embodiment (example 2)

FIG. 23 is a flowchart illustrating a process of the base station apparatus 20 according to the eighth embodiment. It is assumed that the setting unit 97 sets the first mode. That is, the monitoring unit 94 determines that connected wireless terminal does not exist in the service area. The monitoring unit 94 monitors the sleep mode management unit 92, and determines whether the wireless terminal of the sleep mode exists in the service area (step S150). When the determination of step S150 is YES, the setting unit 97 determines whether the second period UI is set long (step S152). When the determination of step S152 is YES, the setting unit 97 sets the second period UI short (step S154). When the determination of step S152 is NO, the second period UI is already set short, and hence the setting unit 97 maintains the setting of the short second period UI.

When the determination of step S150 is NO, the monitoring unit 94 determines whether the paging processing unit 91 has received the paging request message from another device (e.g. the management device 40) (step S156). When the determination of step S156 is YES, the monitoring unit 94 causes the paging processing unit 91 to execute a normal paging process (step S158). That is, the paging processing unit 91 broadcasts the paging advertisement message in the service area. The monitoring unit 94 determines whether the paging processing unit 91 has received the paging response message from the wireless terminal 10 (step S160). When the determination of step S160 is YES, the monitoring unit 94 causes the paging processing unit 91 to transmit the paging response message to another device (e.g. the management device 40) (step S162). Since the wireless terminal of the idle mode exists in the service area, the setting unit 97 sets the second period UI short. When the determination of step S160 is NO, the wireless terminal of the idle mode does not exist in the service area, and hence the setting unit 97 sets the second period UI long.

When the determination of step S156 is NO, the monitoring unit 94 determines whether the terminal management unit 90 periodically receives the location update request from the wireless terminal (step S168). When the determination of step S168 is YES, the setting unit 97 sets the second period UI short since the wireless terminal of the idle mode exists in the service area (step S173). When the determination of step S168 is NO, the monitoring unit 94 causes the paging processing unit 91 to execute the dummy paging (step S170). The monitoring unit 94 determines whether the paging processing unit 91 has received a response from the wireless terminal (step S172). When the determination of step S172 is YES, the setting unit 97 sets the second period UI short. When the determination of step S172 is NO, the setting unit 97 sets the second period UI long.

Figure 24:
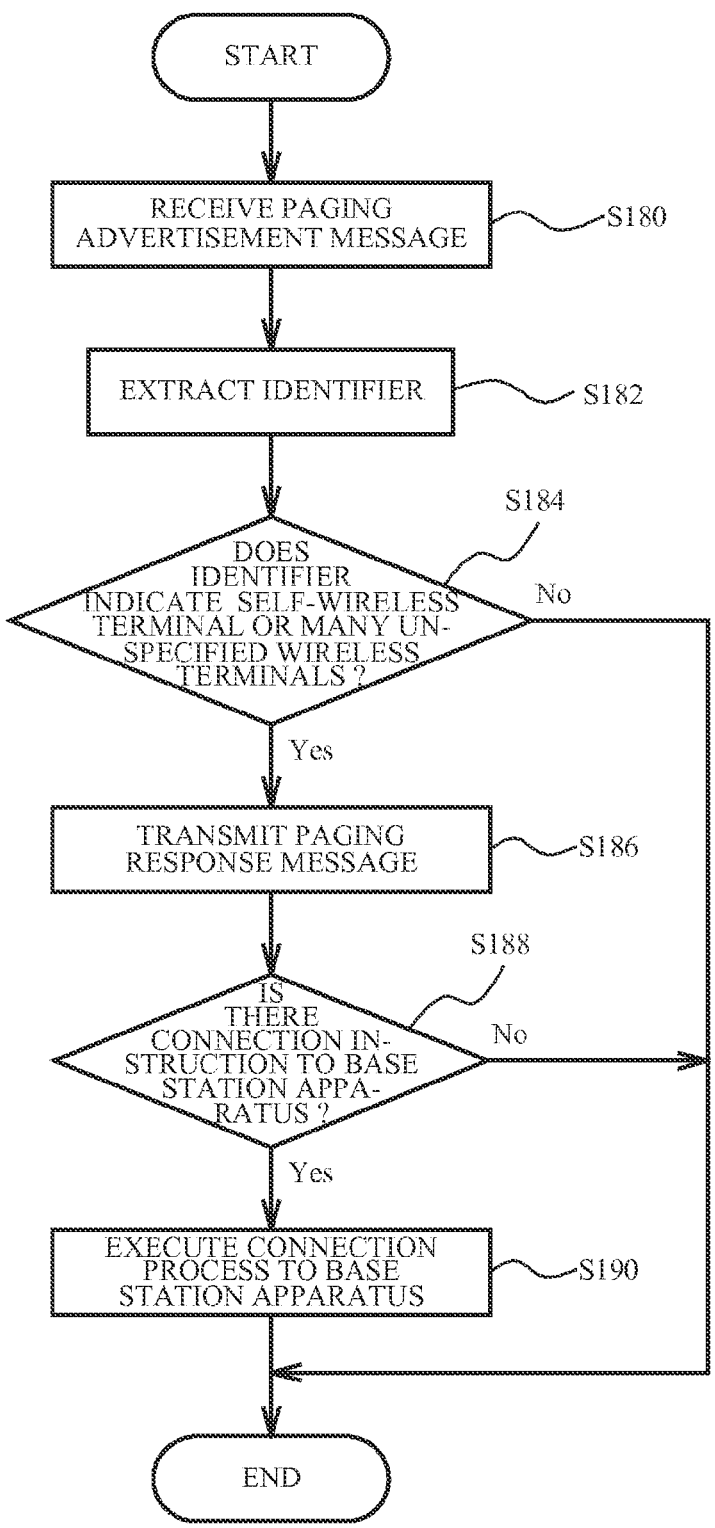
FIG. 24 is a flowchart illustrating a process of the wireless terminal 10 according to the eighth embodiment.

FIG. 24 is a flowchart illustrating a process of the wireless terminal 10 according to the eighth embodiment. The idle mode management unit 71 receives the paging advertisement message (step S180). The extraction unit 72 extracts the identifier (step S182). The paging response processing unit 73 determines whether the identifier indicates the self-wireless terminal or many unspecified wireless terminals (step S184). When the determination of step S184 is NO, the process is terminated. When the determination of step S184 is YES, the paging response processing unit 73 transmits the paging response message (step S186). The paging response processing unit 73 determines whether the paging advertisement message includes an instruction for connecting to the network through the base station apparatus (step S188). When the determination of step S188 is YES, the paging response processing unit 73 is connected to the base station apparatus (step S190). When the determination of step S188 is NO, the process is terminated.

As illustrated in the eighth embodiment, the base station apparatus 20 may includes all functions of the base station apparatus 20 according to the second to seventh embodiments, or a part of functions of the base station apparatus 20 according to the second to seventh embodiments.

In the first to eighth embodiments, the base station apparatus 20 is explained as an example of the Femto base station and the base station apparatus 30 is explained as an example of the macro base station. However, the base station apparatuses 20 and 30 may be another base stations All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A base station apparatus that wirelessly communicates with a wireless terminal, comprising:
   a determination portion that determines a wireless terminal of a normal mode which is connected to and always communicable with the base station apparatus exists in the service area, a wireless terminal of a sleep mode which is connected to and intermittently communicable with the base station apparatus exists in the service area, and a wireless terminal of an idle mode which is not connected to the base station apparatus exists in the service area; and
   a setting portion that sets a first mode in which a first period in which the base station apparatus is communicable with the wireless terminal and a second period in which the base station apparatus is incommunicable with the wireless terminal are provided alternately when the determination portion determines that the wireless terminal of the normal mode does not exist in the service area, sets a second mode in which the base station apparatus is always communicable with the wireless terminal when the determination portion determines that the wireless terminal of the normal mode exists in the service area, sets the second period to a first length and does not change a length of the first period when the determination portion determines that at least one of the wireless terminals of the sleep mode and the wireless terminal of the idle mode exists in the service area and when the setting portion sets the first mode, and sets the second period to a second length longer than the first length and does not change the length of the first period when the determination portion determines that neither the wireless terminal of the sleep mode nor the wireless terminal of the idle mode exists in the service area and when the setting portion sets the first mode.

2. The base station apparatus as claimed in claim 1, wherein when the determination portion receives a location update request for updating an area where the wireless terminal belongs, the determination portion determines that the wireless terminal of the idle mode exists in the service area.

3. The base station apparatus as claimed in claim 1, wherein when the determination portion does not receive a location update request for a given period, the determination portion determines that the wireless terminal of the idle mode does not exist in the service area.

4. The base station apparatus as claimed in claim 2, further comprising a transmission portion that transmits a transmission request for requesting transmission of the location update request, to the wireless terminal.

5. The base station apparatus as claimed in claim 4, wherein the transmission portion that transmits the transmission request to a given wireless terminal in which the connection with the base station apparatus is permitted.

6. The base station apparatus as claimed in claim 4, wherein the transmission portion that transmits the transmission request to an unspecified wireless terminal.

7. The base station apparatus as claimed in claim 1, wherein when the determination portion determines that a wireless terminal of a normal mode in the service area executes handover to another base station apparatus, and another wireless terminal of the normal mode does not exist in the service area, the setting portion sets the first mode.

8. The base station apparatus as claimed in claim 1, wherein when the determination portion determines that the wireless terminal of the normal mode changes to the sleep mode or the idle mode, and another wireless terminal of the normal mode does not exist in the service area, the determination portion determines that the wireless terminal of the sleep mode or the idle mode exists in the service area.

9. The base station apparatus as claimed in claim 1, wherein the base station apparatus is a Femto base station.

10. A communication system including a wireless terminal and a base station apparatus that wirelessly communicates with the wireless terminal, comprising:
the base station apparatus including:
a determination portion that determines a wireless terminal of a normal mode which is connected to and always communicable with the base station apparatus exists in the service area, a wireless terminal of a sleep mode which is connected to and intermittently communicable with the base station apparatus exists in the service area, and a wireless terminal of an idle mode which is not connected to the base station apparatus exists in the service area; and
a setting portion that sets a first mode in which a first period in which the base station apparatus is communicable with the wireless terminal and a second period in which the base station apparatus is incommunicable with the wireless terminal are provided alternately when the determination portion determines that the wireless terminal of the normal mode does not exist in the service area, sets a second mode in which the base station apparatus is always communicable with the wireless terminal when the determination portion determines that the wireless terminal of the normal mode exists in the service area, sets the second period to a first length and does not change the length of a first period when the determination portion determines that at least one of the wireless terminals of the sleep mode and the wireless terminal of the idle mode exists in the service area and when the setting portion sets the first mode, and sets the second period to a second length longer than the first length and does not change the length of the first period when the determination portion determines that neither the wireless terminal of the sleep mode nor the wireless terminal of the idle mode exists in the service area and when the setting portion sets the first mode.

11. A method for controlling a communication system including a wireless terminal and a base station apparatus that wirelessly communicates with the wireless terminal, comprising:
determining a wireless terminal of a normal mode which is connected to and always communicable with the base station apparatus exists in the service area, a wireless terminal of a sleep mode which is connected to and intermittently communicable with the base station apparatus exists in the service area, and a wireless terminal of an idle mode which is not connected to the base station apparatus exists in the service area;
setting a first mode in which a first period in which the base station apparatus is communicable with the wireless terminal and a second period in which the base station apparatus is incommunicable with the wireless terminal are provided alternately when determining that the wireless terminal of the normal mode does not exist in the service area, setting a second mode in which the base station apparatus is always communicable with the wireless terminal when determining that the wireless terminal of the normal mode exists in the service area, setting the second period to a first length and does not change a length of the first period when determining that at least one of the wireless terminals of the sleep mode and the wireless terminal of the idle mode exists in the service area and when setting the first mode, and setting the second period to a second length longer than the first length and does not change the length of the first period when determining that neither the wireless terminal of the sleep mode nor the wireless terminal of the idle mode exists in the service area and when setting the first mode.

* * * * *